United States Patent
Keithley et al.

(10) Patent No.: US 8,681,381 B1
(45) Date of Patent: Mar. 25, 2014

(54) PIXEL STACKING AVOIDANCE ERROR DIFFUSION HALFTONE

(75) Inventors: Douglas G. Keithley, Boise, ID (US); Randall D. Briggs, Boise, ID (US)

(73) Assignee: Marvell International Ltd. (BM)

( * ) Notice: Subject to any disclaimer, the term of this patent is extended or adjusted under 35 U.S.C. 154(b) by 773 days.

(21) Appl. No.: 12/617,364

(22) Filed: Nov. 12, 2009

Related U.S. Application Data

(60) Provisional application No. 61/113,817, filed on Nov. 12, 2008, provisional application No. 61/115,257, filed on Nov. 17, 2008, provisional application No. 61/116,498, filed on Nov. 20, 2008.

(51) Int. Cl.
 *H04N 1/405* (2006.01)

(52) U.S. Cl.
 USPC ......... 358/3.06; 358/1.9; 358/3.03; 358/3.24; 358/533; 358/534

(58) Field of Classification Search
 USPC ................. 358/3.03–3.24, 533–536
 See application file for complete search history.

(56) References Cited

U.S. PATENT DOCUMENTS

| | | | | | |
|---|---|---|---|---|---|
| 5,045,952 | A | * | 9/1991 | Eschbach | 358/447 |
| 5,289,294 | A | * | 2/1994 | Fujisawa | 358/461 |
| 5,739,917 | A | * | 4/1998 | Shu et al. | 358/2.1 |
| 5,949,965 | A | * | 9/1999 | Gondek | 358/1.9 |
| 6,057,933 | A | * | 5/2000 | Hudson et al. | 358/1.9 |
| 6,501,564 | B1 | * | 12/2002 | Schramm et al. | 358/1.9 |
| 6,714,320 | B1 | * | 3/2004 | Nakahara et al. | 358/3.13 |
| 6,867,884 | B1 | * | 3/2005 | Rozzi | 358/1.9 |
| 6,870,644 | B2 | * | 3/2005 | Schramm et al. | 358/3.05 |
| 6,870,645 | B1 | * | 3/2005 | Schramm et al. | 358/3.14 |
| 6,906,825 | B1 | * | 6/2005 | Nakahara et al. | 358/1.9 |
| 7,203,376 | B2 | * | 4/2007 | Takahashi et al. | 382/252 |
| 7,760,400 | B2 | * | 7/2010 | Ishii et al. | 358/3.22 |
| 8,169,665 | B2 | * | 5/2012 | Wong et al. | 358/3.04 |
| 2001/0021041 | A1 | * | 9/2001 | Suzuki | 358/458 |
| 2003/0103241 | A1 | | 6/2003 | Sharma | |

* cited by examiner

*Primary Examiner* — Richard Zhu

(57) ABSTRACT

A method and system for generating a halftone image from an input image is disclosed. Visible artifacts caused by the correlation of one or more colors or color planes are avoided because the halftone image analysis for one color affects the halftone image analysis for subsequent colors. A printer controller analyzes at least a part of the input image to dynamically set a sequence of the plurality of colors. Halftone image analysis is carried out in the sequence of the plurality of colors to generate the halftone image.

18 Claims, 22 Drawing Sheets

| 193 | 140 | 38 | 68 | 66 | 95 | 78 | 196 | 21 | 251 | 220 | 23 | 143 | 57 | 179 | 24 |
|---|---|---|---|---|---|---|---|---|---|---|---|---|---|---|---|
| 98 | 196 | 70 | 214 | 242 | 217 | 102 | 67 | 236 | 237 | 207 | 226 | 94 | 184 | 181 | 59 |
| 227 | 98 | 142 | 76 | 31 | 92 | 103 | 224 | 208 | 253 | 209 | 233 | 142 | 8 | 236 | 69 |
| 20 | 196 | 89 | 240 | 239 | 62 | 231 | 222 | 228 | 61 | 69 | 40 | 178 | 178 | 114 | 158 |
| 168 | 42 | 33 | 161 | 5 | 214 | 190 | 225 | 255 | 15 | 195 | 215 | 90 | 197 | 56 | 234 |
| 21 | 37 | 205 | 216 | 118 | 38 | 197 | 152 | 63 | 184 | 245 | 140 | 28 | 192 | 178 | 122 |
| 130 | 109 | 221 | 222 | 147 | 91 | 72 | 60 | 10 | 4 | 8 | 243 | 138 | 206 | 119 | 109 |
| 26 | 241 | 6 | 248 | 99 | 49 | 137 | 134 | 156 | 240 | 29 | 132 | 110 | 6 | 103 | 180 |
| 201 | 37 | 40 | 33 | 89 | 102 | 164 | 96 | 249 | 47 | 250 | 177 | 178 | 197 | 126 | 47 |
| 90 | 80 | 159 | 72 | 57 | 40 | 90 | 188 | 65 | 109 | 106 | 217 | 81 | 43 | 128 | 165 |
| 220 | 255 | 128 | 174 | 155 | 133 | 178 | 14 | 45 | 74 | 128 | 38 | 216 | 98 | 152 | 239 |
| 217 | 240 | 16 | 254 | 82 | 101 | 96 | 116 | 31 | 156 | 96 | 114 | 201 | 186 | 156 | 154 |
| 211 | 31 | 2 | 183 | 145 | 25 | 131 | 114 | 21 | 66 | 209 | 94 | 104 | 87 | 206 | 206 |
| 156 | 111 | 187 | 25 | 20 | 173 | 154 | 249 | 110 | 137 | 126 | 157 | 33 | 128 | 124 | 235 |
| 250 | 132 | 15 | 181 | 53 | 249 | 165 | 96 | 55 | 186 | 184 | 96 | 175 | 168 | 54 | 159 |
| 46 | 12 | 84 | 184 | 169 | 168 | 59 | 47 | 111 | 208 | 226 | 27 | 56 | 157 | 68 | 20 |

| 16 | 3 | -23 | -15 | -16 | -8 | -13 | 17 | -27 | 31 | 23 | -26 | 4 | -18 | 13 | -26 |
|---|---|---|---|---|---|---|---|---|---|---|---|---|---|---|---|
| -8 | 17 | -15 | 22 | 29 | 22 | -7 | -15 | 27 | 27 | 20 | 25 | -9 | 14 | 13 | -17 |
| 25 | -8 | 4 | -13 | -24 | -9 | -6 | 24 | 20 | 31 | 20 | 26 | 4 | -30 | 27 | -15 |
| -27 | 17 | -10 | 28 | 28 | -17 | 26 | 24 | 25 | -17 | -15 | -22 | 13 | 13 | -4 | 8 |
| 10 | -22 | -24 | 8 | -31 | 22 | 16 | 24 | 32 | -28 | 17 | 22 | -10 | 17 | -18 | 27 |
| -27 | -23 | 19 | 22 | -3 | -23 | 17 | 6 | -16 | 14 | 29 | 3 | -25 | 16 | 13 | -2 |
| 1 | -5 | 23 | 24 | 5 | -9 | -14 | -17 | -30 | -31 | -30 | 29 | 3 | 20 | -2 | -5 |
| -26 | 28 | -31 | 30 | -7 | -20 | 2 | 2 | 7 | 28 | -25 | 1 | -5 | -31 | -6 | 13 |
| 18 | -23 | -22 | -24 | -10 | -7 | 9 | -8 | 30 | -20 | 31 | 12 | 13 | 17 | -1 | -20 |
| -10 | -12 | 8 | -14 | -18 | -22 | -10 | 15 | -16 | -5 | -6 | 22 | -12 | -21 | 0 | 9 |
| 23 | 32 | 0 | 12 | 7 | 1 | 13 | -29 | -21 | -14 | 0 | -23 | 22 | -8 | 6 | 28 |
| 22 | 28 | -28 | 32 | -12 | -7 | -8 | -3 | -24 | 7 | -8 | -4 | 18 | 15 | 7 | 7 |
| 21 | -24 | -32 | 14 | 4 | -26 | 1 | -4 | -27 | -16 | 20 | -9 | -6 | -10 | 20 | 20 |
| 7 | -4 | 15 | -26 | -27 | 11 | 7 | 30 | -5 | 2 | -1 | 7 | -24 | 0 | -1 | 27 |
| 31 | 1 | -28 | 13 | -19 | 30 | 9 | -8 | -18 | 15 | 14 | -8 | 12 | 10 | -19 | 8 |
| -21 | -29 | -11 | 14 | 10 | 10 | -17 | -20 | -4 | 20 | 25 | -25 | -18 | 7 | -15 | -27 |

| 16 | 3 | -23 | -15 | -16 | -8 | -13 | 17 | -27 | 31 | 23 | -26 | 4 | -18 | 13 | -26 |
|---|---|---|---|---|---|---|---|---|---|---|---|---|---|---|---|
| -8 | 17 | -15 | 22 | 29 | 22 | -7 | -15 | 27 | 27 | 20 | 25 | -9 | 14 | 13 | -17 |
| 25 | -8 | 4 | -13 | -24 | -9 | -6 | 24 | 20 | 31 | 20 | 26 | 4 | -120 | 27 | -15 |
| -27 | 17 | -10 | 28 | 28 | -17 | 26 | 24 | 25 | -17 | -15 | -22 | 13 | 13 | -4 | 8 |
| 10 | -22 | -24 | 8 | -123 | 22 | 16 | 24 | 32 | -28 | 17 | 22 | -10 | 17 | -18 | 27 |
| -27 | -23 | 19 | 22 | -3 | -23 | 17 | 6 | -16 | 14 | 29 | 3 | -25 | 16 | 13 | -2 |
| 1 | -5 | 23 | 24 | 5 | -9 | -14 | -17 | -118 | -124 | -120 | 29 | 3 | 20 | -2 | -5 |
| -26 | 28 | -122 | 30 | -7 | -20 | 2 | 2 | 7 | 28 | -25 | 1 | -5 | -122 | -6 | 13 |
| 18 | -23 | -22 | -24 | -10 | -7 | 9 | -8 | 30 | -20 | 31 | 12 | 13 | 17 | -1 | -20 |
| -10 | -12 | 8 | -14 | -18 | -22 | -10 | 15 | -16 | -5 | -6 | 22 | -12 | -21 | 0 | 9 |
| 23 | 32 | 0 | 12 | 7 | 1 | 13 | -114 | -21 | -14 | 0 | -23 | 22 | -8 | 6 | 28 |
| 22 | 28 | -28 | 32 | -12 | -7 | -8 | -3 | -24 | 7 | -8 | -4 | 18 | 15 | 7 | 7 |
| 21 | -24 | -126 | 14 | 4 | -26 | 1 | -4 | -27 | -16 | 20 | -9 | -6 | -10 | 20 | 20 |
| 7 | -4 | 15 | -26 | -27 | 11 | 7 | 30 | -5 | 2 | -1 | 7 | -24 | 0 | -1 | 27 |
| 31 | 1 | -28 | 13 | -19 | 30 | 9 | -8 | -18 | 15 | 14 | -8 | 12 | 10 | -19 | 8 |
| -21 | 116 | -11 | 14 | 10 | 10 | -17 | -20 | -4 | 20 | 25 | -25 | -18 | 7 | -15 | -27 |

| 16 | 3 | -23 | -15 | -16 | -8 | -13 | 17 | -27 | 123 | 23 | -26 | 4 | -18 | 13 | -26 |
|---|---|---|---|---|---|---|---|---|---|---|---|---|---|---|---|
| -8 | 17 | -15 | 22 | 114 | 22 | -7 | -15 | 27 | 27 | 20 | 25 | -9 | 14 | 13 | -17 |
| 25 | -8 | 4 | -13 | -24 | -9 | -6 | 24 | 20 | 125 | 20 | 26 | 4 | -30 | 27 | -15 |
| -27 | 17 | -10 | 28 | 28 | -17 | 26 | 24 | 25 | -17 | -15 | -22 | 13 | 13 | -4 | 8 |
| 10 | -22 | -24 | 8 | -31 | 22 | 16 | 24 | 127 | -28 | 17 | 22 | -10 | 17 | -18 | 27 |
| -27 | -23 | 19 | 22 | -3 | -23 | 17 | 6 | -16 | 14 | 117 | 3 | -25 | 16 | 13 | -2 |
| 1 | -5 | 23 | 24 | 5 | -9 | -14 | -17 | -30 | -31 | -30 | 115 | 3 | 20 | -2 | -5 |
| -26 | 113 | -31 | 120 | -7 | -20 | 2 | 2 | 7 | 28 | -25 | 1 | -5 | -31 | -6 | 13 |
| 18 | -23 | -22 | -24 | -10 | -7 | 9 | -8 | 121 | -20 | 122 | 12 | 13 | 17 | -1 | -20 |
| -10 | -12 | 8 | -14 | -18 | -22 | -10 | 15 | -16 | -5 | -6 | 22 | -12 | -21 | 0 | 9 |
| 23 | 32 | 0 | 12 | 7 | 1 | 13 | -29 | -21 | -14 | 0 | -23 | 22 | -8 | 6 | 28 |
| 22 | 28 | -28 | 126 | -12 | -7 | -8 | -3 | -24 | 7 | -8 | -4 | 18 | 15 | 7 | 7 |
| 21 | -24 | -32 | 14 | 4 | -26 | 1 | -4 | -27 | -16 | 20 | -9 | -6 | -10 | 20 | 20 |
| 7 | -4 | 15 | -26 | -27 | 11 | 7 | 121 | -5 | 2 | -1 | 7 | -24 | 0 | -1 | 27 |
| 122 | 1 | -28 | 13 | -19 | 121 | 9 | -8 | -18 | 15 | 14 | -8 | 12 | 10 | -19 | 8 |
| -21 | -29 | -11 | 14 | 10 | 10 | -17 | -20 | -4 | 20 | 25 | -25 | -18 | 7 | -15 | -27 |

PIXEL STACKING AVOIDANCE ERROR DIFFUSION HALFTONE

CROSS-REFERENCE TO RELATED APPLICATIONS

This application claims the benefit of U.S. Provisional Application No. 61/113,817, filed Nov. 12, 2008, which is hereby incorporated by reference. This application claims the benefit of U.S. Provisional Application No. 61/115,257, filed Nov. 17, 2008, which is hereby incorporated by reference. This application claims the benefit of U.S. Provisional Application No. 61/116,498, filed Nov. 20, 2008, which is hereby incorporated by reference.

BACKGROUND

Both color and grayscale digital images are composed of picture elements (pixels), where each pixel is represented by multiple binary bits that define either a color or a gray level. In order to reproduce such an image on a printer or copier, the individual color or gray level pixels are converted to binary level pixels through use of a digital halftoning process. Binary pixels are used because the printer is only capable of either printing a dot or not printing a dot at each location. Variations in the intensity of the pixel are represented by patterns of dots.

Digital halftoning is a technique that simulates continuous-tone imagery through the use of dots. Digital halftoning uses a process of transforming a continuous-tone image into a lower bit depth image, typically binary, that has the illusion of the original continuous tone image, based on a careful arrangement of lower bit depth pixels. In this way, the arrangement of black or white dots is designed to give the human eye the perception of many shades of gray (or another color).

A conventional digital halftoning technique may use a threshold table, such as threshold table 10 as illustrated in FIG. 1. The threshold table 10 contains values that is compared to the tone values across the entire image 11. In particular, each location in the image 11 includes an incoming tone value that is compared to the value in the threshold table for each location. If the value of the incoming tone meets or exceeds the value in the threshold table, a dot will be placed on that location of the image 11 on the paper.

In this way, an incoming tone value of 5 will result in a dot in the location of the five pixels corresponding to threshold table values equal to or less than five. However, using the conventional threshold table may result in unwanted patterns in the resulting image. For example, given a long series of identical or similar incoming tone values, patterns of dots or the absence of dots may emerge.

Another approach to digital halftoning is error diffusion. In error diffusion, the difference between the incoming tone and the binary output (dot printed/no dot printed) is calculated as an error that is propagated to the calculation of future pixels. In theory, as the process repeats, the cumulative error approaches zero. FIG. 2 illustrates an example of an error diffusion table 21, in which a set of weights (W1, W2, W3, and W4) is used to distribute the error from a single pixel's halftone decision. The weights determine how the error is diffused to other pixels. For example, if the error was diffused evenly among W1, W2, W3, and W4, each weight would be ¼.

Given a threshold of 5, an input tone of 5 would result in assigning a dot to the output pixel. The dot corresponds to a value of 9. In this binary system, the only possible printed values are 0 (no dot printed) and 9 (dot printed). An input tone of 5 results in a dot or a value of 9, which results in an excess of 4 (9-5). The excess is carried forward by subtracting 1 from each of the pixels that receives weights W1, W2, W3, and W4. If the next incoming pixel was a 5, the 1 is subtracted, resulting in 4 which is less than the threshold of 5, resulting in no dot being assigned to that location. Because no dot corresponds to a value of 0, the absence of a dot results in a deficiency of 4. Accordingly, that error will be diffused to other pixels. The process repeats for all pixels.

Threshold tables tend to work well with laser printing. However, moiré effects or banding is often visible to the human eye. This problem can be exacerbated when copying a page printed on a laser printer using a multi-function printer ("MFP"). When the repeated pattern of dots generated in printing is slightly misaligned with the threshold table, artifacts can occur. The artifacts are caused when frequency components of the image resonate with the fixed placement enforced by the threshold table.

Error diffusion tends to work well with copying. However, error diffusion often leads to clumps of dots followed by the absence of dots. In other words, even though the error is spread out among pixels, the patterns of the movement of the error may still be visible to the human eye.

Thus, conventional threshold-based halftoning and error diffusion may result in unwanted patterns in the printed image that the human eye perceives. Given these problems, an apparatus and method for digital halftoning that reduces the unwanted patterns in the printed image would be desirable.

SUMMARY OF THE INVENTION

A method and system for generating a halftone image from an input image including a plurality of colors is disclosed. A printer controller analyzes at least a part of the input image to dynamically set a sequence of the plurality of colors. Halftone image analysis is carried out in the sequence of the plurality of colors to generate the halftone image. The at least a part of the input image may be a pixel.

The present invention is defined by the following claims, and nothing in this section should be taken as a limitation on those claims. The preferred embodiments will now be described with reference to the attached drawings.

DETAILED DESCRIPTION

A method and system for generating a halftone image from an input image is disclosed. The method and system use error distribution and threshold perturbation. The threshold perturbation is calculated as a function of incoming tone values in order to reduce the patterns in the halftone image visible to the human eye. In one implementation, a threshold perturbation value (or threshold bias value) may be calculated for one, some, or each incoming tone value. In practice, a threshold perturbation table may be composed of threshold perturbation values and be used to change the threshold that is compared to an incoming pixel's tone value. As one example, if a string of midtone values are the incoming tone values, some output pixels will be turned on and others off as the threshold fluctuates based on the threshold bias table.

Using threshold bias tables to vary the threshold may improve the quality of the halftone image because repeating patterns in the image may be less apparent to the casual observer. In particular, as the threshold biases are varied, more randomness may be introduced to the halftone algorithm and fewer patterns may be noticeable to the observer, resulting in a more pleasing image. Further, a more desirable arrangement of threshold biases may depend on the value of the incoming tone. The threshold bias table may comprise a unique threshold bias table that includes a value for each possible incoming tone. The unique threshold bias table may require larger amounts of memory; or, the threshold bias tables may be dynamically generated from a single table, thereby potentially reducing the storage requirements.

In one embodiment, the method and system for generating a halftone image from an input image may also dynamically adjust the error terms used in error diffusion, so that the overall function can implement a full error diffusion (all of the error is distributed), a partial error diffusion (only a portion of the full error is distributed), or a straight threshold implementation (no error is distributed).

Figure 3:
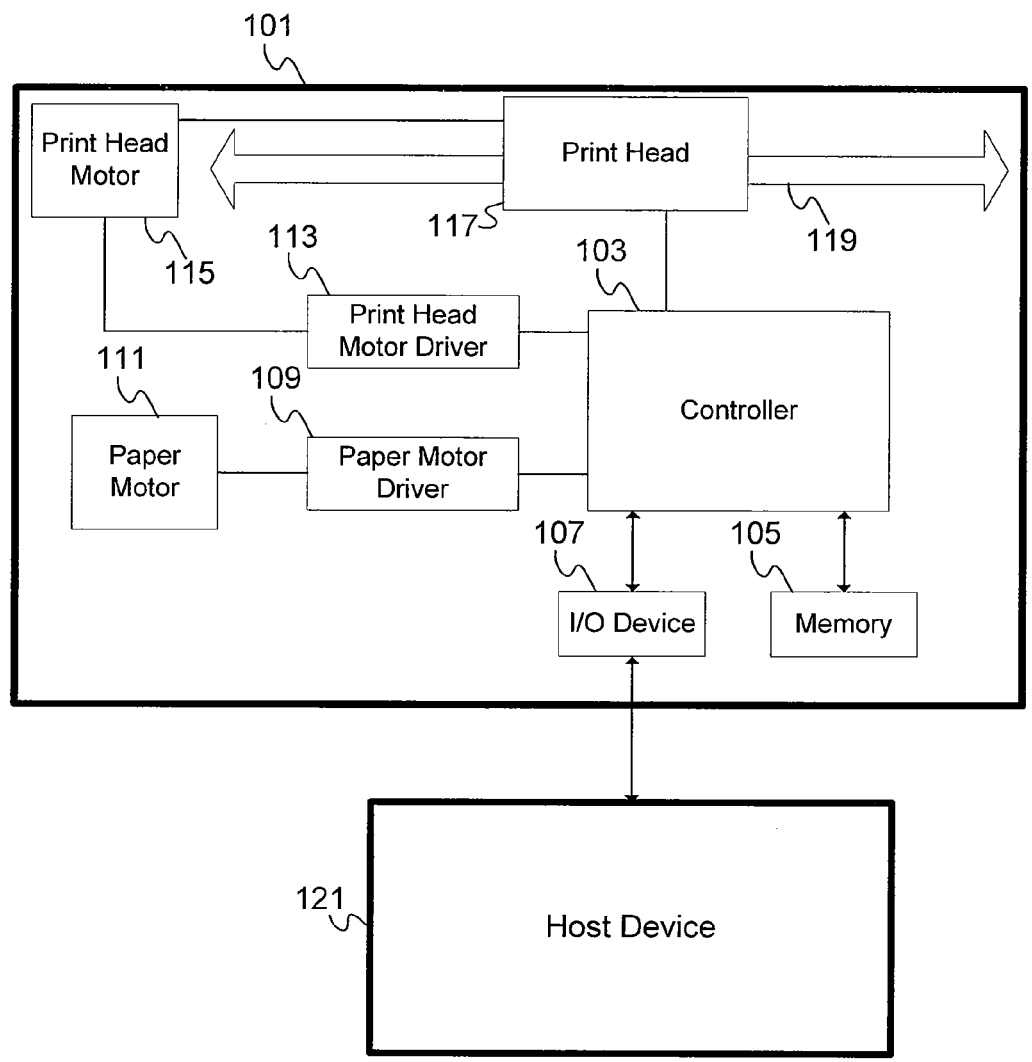
FIG. 3 illustrates one implementation of a printer embodying the tone dependent threshold perturbation error diffusion halftone.

FIG. 3 illustrates one implementation of a printer 101 embodying the tone dependent threshold perturbation error diffusion halftone. Printer 101 includes a printing device, such as print head 117, which travels along print axis 119. Print head 117 may comprise an inkjet carriage. A print head motor 115 moves the print head 117 along print axis 119 under the direction of print head motor driver 113. A paper motor 111, controlled by paper motor driver 109, moves recording media through printer 101 and past print head 117. The functions of paper motor 111 and print head motor 115 may be implemented using a single motor.

A controller 103 provides command signals to paper motor 111, print head motor 115, and print head 117. Controller 103 is coupled to memory 105 and communicates with a host device 121 through input/output device 107. Memory 105 may alternatively be located internal to controller 103. The host device 121 may be a computer connected locally or through a network, a portable device such as a personal digital assistant (PDA), or a digital camera. Controller 103 may be an application specific integrated circuit (ASIC) or any programmable device.

Figure 4:
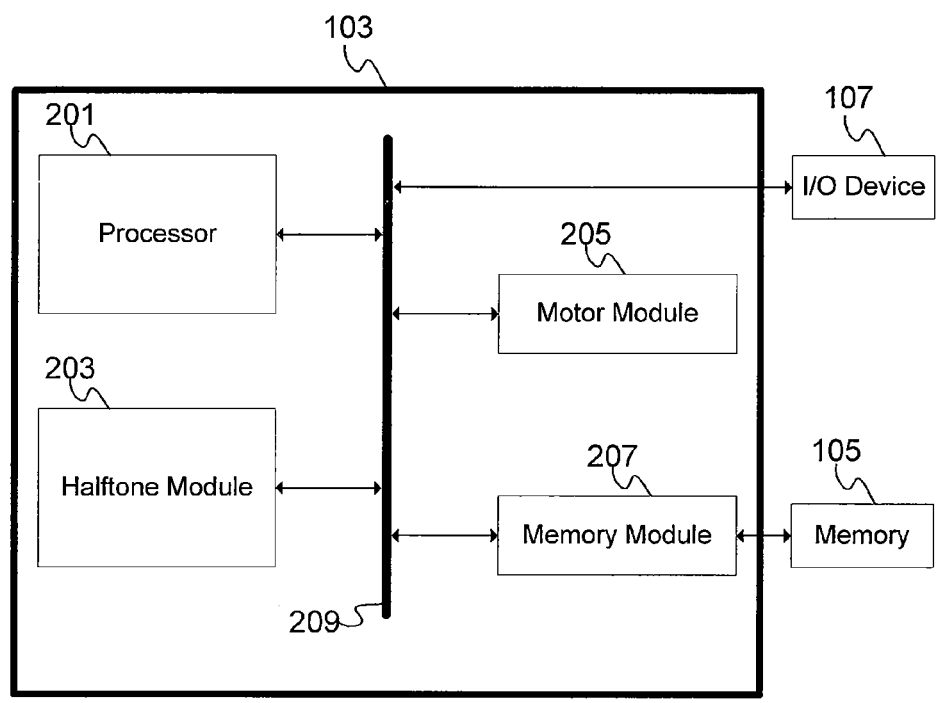
FIG. 4 illustrates a detailed view of the controller in the printer of FIG. 3.

FIG. 4 illustrates a detailed view of the controller 103. Controller 103 includes a processor 201, a halftone module 203, a motor module 205, and a memory module 207, each in communication by way of communications path or bus 209. Communication bus 209 is an interface with I/O device 107 for receiving the input image. Communication bus 209 may comprise a hardware bus or a software connection. Motor module 205 provides instructions for the print head motor driver 113 and paper motor driver 109. Memory module 207 accesses memory 105, which may store the threshold tables, threshold bias tables, and error distributions discussed herein. Memory 105 may alternatively be located internal to controller 103, and connected directly to communication path 209 or halftone module 203. In one implementation, memory 105 stores only a single threshold table. Communication path 209 also allows the controller 103 to communicate the image data calculated by the halftone module 203 to the print head 117, as discussed in more detail below.

The following examples are generally discussed in the context of a high resolution grayscale image using an 8-bit per pixel input image and a 1-bit per pixel output image. Threshold tables and threshold bias tables may be constructed to include $2^n-1$ tone values where n is equal to a number of bits per pixel of the input image.

All of the principles disclosed herein may be applied to other bit-per pixel input images, such as a 24-bit per pixel input image (8 bits for each of three colors such as red, green, and blue), as well as an output image with 2 bits per pixel or a higher bit depth. The input image may be encoded in any resolution and the embodiments disclosed could be adapted to produce an output image with more than 1 bit per pixel. For example, 2 bits per pixel may be used as some printers are configured to place 0, 1, or 2 drops of ink in a single pixel. Further, some printers utilize 2, 4, 6, or 8 colors of ink or toner. For these reasons, a large number of combinations of input images and output images are possible. The following discussion will focus on the case of an 8-bit per pixel input image and a 1-bit per pixel output image; however, the discussion is merely for illustration purposes and other bit-per pixel input images and bit-per pixel output images may be used.

The following examples also generally discuss using an input image that includes a single tone. This is done to simplify the algorithms and calculations involved. However, one of ordinary skill in the art may readily adapt the following examples to an input image that includes pixels of varying tones and in any pattern.

The halftone module 203 performs the calculations and operations for the tone dependent threshold perturbation error diffusion halftone algorithm. In one implementation, a unique threshold bias table is generated for each possible incoming tone value. The unique threshold bias tables may be generated and stored ahead of time or they may be generated when they are needed (such as in real-time). The unique threshold bias tables may then be used for threshold perturbation in an error diffusion algorithm. In one implementation, the processor 201 performs the functions of the halftone module 203.

Figures 5, 6:
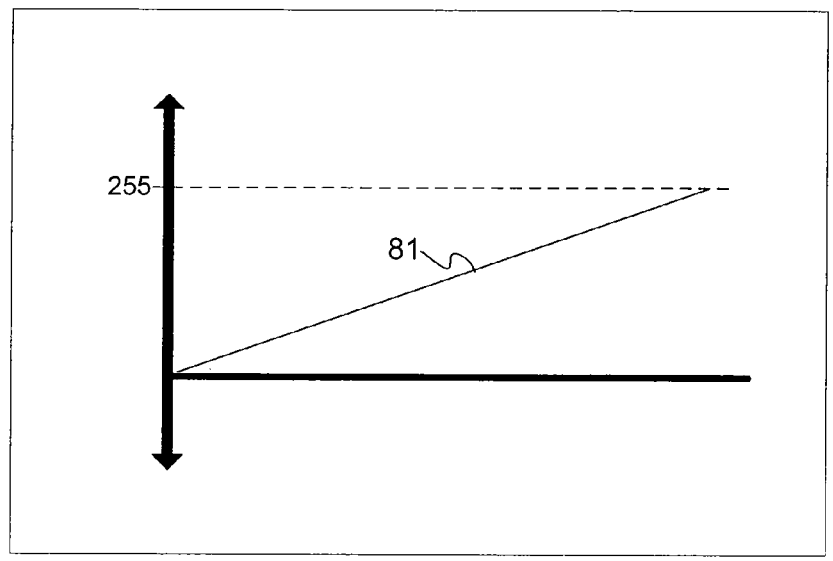
FIG. 5 illustrates an example of a threshold table.
FIG. 6 illustrates a graph of the values of the entries in the threshold table of FIG. 5.

Storing a unique threshold bias table for each possible incoming tone value may require a substantial amount of memory. Generating the incoming tone values in real-time (or in an as-needed basis) reduces the required memory. Threshold bias tables may be generated in real-time from a single threshold table. FIG. 5 is an example of a threshold table for a single color represented using 8 bits per pixel. Because 8 bits per pixel are used, the number of shades available is 256, and the threshold table uses threshold values from 1 to 255, with a shade value of 0 indicating white or an absence of color. The shades may be either grayscale or a color such as red, green, or blue. In an alternative color space, the shades could be black, cyan, magenta, and yellow. The values in the threshold table may be selected either randomly, using a random number generator or pseudo random number generator, or by using values indicative of blue noise with minimal low frequency components, which reduces the clumping of values. Further, the values in the threshold table may be selected by arranging the values 1 to 255, one at a time and in a predetermined pattern.

The threshold table may then be used in digital halftoning. For example, an incoming tone for each pixel of the input image may be compared to the corresponding value in the threshold table. If the value of the incoming tone meets or exceeds the value in the threshold table, a dot will be placed on that location of the image on the paper. However, in tone dependent threshold perturbation error diffusion halftoning, the threshold table will be modified for use in the tone dependent threshold perturbation error diffusion halftone algorithm.

The graph of FIG. 6 illustrates the values of the threshold table in FIG. 5 plotted against a sequential numbering of their positions in the table. Line 61 on the graph shows each of the values in the table of FIG. 5 on the vertical axis and a location index on the horizontal axis.

Figures 7, 8:
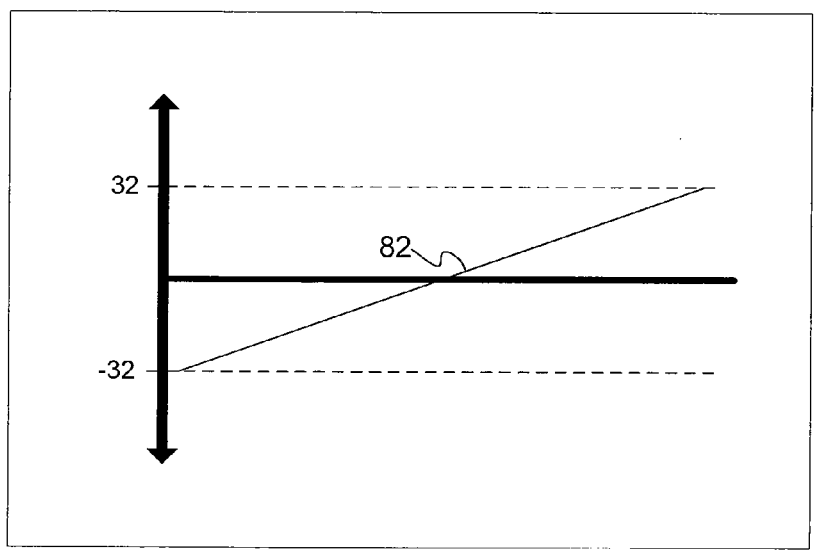
FIG. 7 illustrates an example of a threshold bias table for a midtone value.
FIG. 8 illustrates a graph of the values of the entries in the threshold bias table of FIG. 7.

FIG. 7 illustrates an example of a threshold bias table for a midtone value. One way to build a threshold bias table is to start with a table similar to the threshold table of FIG. 5, in which the values 1 to 255 are listed. The threshold bias table may be constructed such that the arrangement of dots accurately represents the tone value of the input image. Because the values in the threshold bias table are used for threshold perturbation, the values may be reduced so that the range of the values is smaller. In one example, the entries are reduced by subtracting 128 and then dividing each value by four and truncating the remainder or rounding the remainder. This method results in values ranging from −32 to 32.

Alternatively, a suitable threshold bias table can be constructed by starting with a threshold table including randomly selected values between −127 and 127, dividing each value by four, and truncating or rounding the remainder. Finally, the threshold bias table may be constructed by randomly selecting a value between −32 and 32 for each position in the threshold bias table.

The 0's in the threshold table and/or the threshold bias table may be changed to predetermined nonzero values to make the tables more symmetric (centered about 0), if desired. For example, the 0's in the threshold table could be replaced with 128 as a preliminary step. The discussed initial values, division of the values, and truncating/rounding are merely for illustrative purposes.

The graph of FIG. 8 illustrates the values of the threshold bias table in FIG. 7 plotted against a sequential numbering of their positions in the table. Line 82 on the graph shows that each of the values from −32 to 32 is used in an even distribution.

The threshold bias table (or threshold perturbation table) shown in FIG. 7 is used to vary the threshold in error distribution halftoning. For example, the threshold bias table of FIG. 7 is used to bias a threshold table such as the one shown in FIG. 5. In other words, the values in the threshold bias table of FIG. 7 are added to (or act as a bias for) corresponding values in the threshold table of FIG. 5.

When processor 201 receives the input image as a plurality of tone values, halftone module 203 compares the tone values to the corresponding entries in the threshold table. When the incoming value meets or exceeds the entry in the threshold table, a dot is assigned to that location. The halftone module 203 may adjust the comparison of subsequent pixels using error distribution, such as using the difference between the first tone value and a binary representation of the dot.

A quantity that corresponds to the difference between the input tone and the scaled representation of the input tone, which is either 0 (if no dot was printed) or 255 (if a dot was printed) will be added (or subtracted) to future input tone values as they are applied to adjacent and nearby pixels. These quantities may be weighted in percentages. For example, the error could be distributed to adjacent pixels, such as the ten nearest pixels that have not yet been processed in weights of 10% to each. The weights can be adjusted in any combination. The weights can also be a function of the input tone. For light pixels, it may be desirable to spread the error over a larger area. For dark pixels, it may be desirable to spread the area over a smaller area, such as the four adjacent pixels. Although the weights normally will add up to 100%, the weights could add up to less than 100% and the excess error ignored or discarded. In other words, the amount of error distributed from preceding locations to the current pixel may be a function of the tone value of the current pixel.

For light pixels or dark pixels, error distribution results in patterns or artifacts becoming visible as the error builds up through a long string of pixels. For example, the error may add up and cause a dot to be printed after a large white space or cause a dot to not be printed after a large dark space. To reduce this concern, the threshold bias tables for light pixels and dark pixels are constructed differently. The function used to construct threshold bias tables adds additional bias to selected locations in the threshold bias tables that are generated for light pixels and dark pixels.

Figures 9, 10:
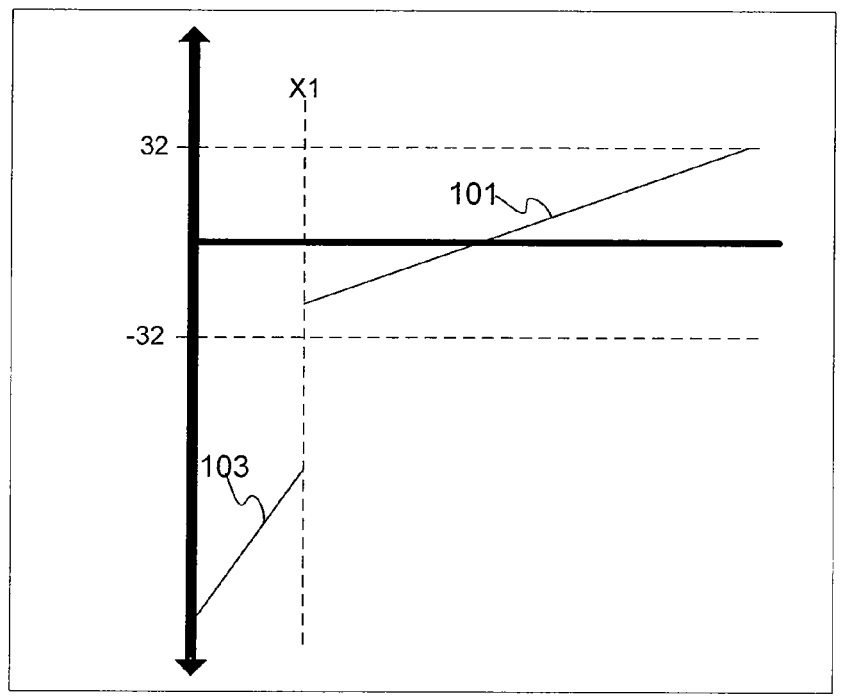
FIG. 9 illustrates an example of a threshold bias table for a light tone value.
FIG. 10 illustrates a graph of the values of the entries in the threshold bias table of FIG. 9.

FIG. 9 illustrates an example of threshold bias table for a light tone value. The light tone value in this example is 14 on a 0 to 255 scale. The threshold bias table for a light tone in FIG. 9 is constructed in a similar fashion to the threshold bias table for a midtone discussed above with reference to FIG. 7. For example, the threshold bias table can be generated by starting with a table similar to the threshold table of FIG. 5, in which the values 1 to 255 are listed, subtracting 128, and then dividing the result by four, truncating the remainder or rounding the remainder. However, for the values that correspond to the light tone value (14) or lower, the result is not divided. In other words, for the entries that correspond to the light tone value (14) or lower, the value will remain on the −127 to 127 scale. A similar table could also be generated by scaling all values by a factor and subtracting a constant from the entries that correspond to the light tone value (14) or lower.

The shaded rectangles in FIG. 9 illustrate the locations in the table that correspond to the light tone value (14) or lower. The shaded rectangles do not necessary represent that a dot will be placed in that location, but the shaded rectangles do indicate that those locations are much more likely to receive a dot than the locations that are not shaded. In other words, the threshold value may be calculated as a function of the incoming tone value or as a function of both the incoming tone value and the location of the threshold value in the threshold bias table.

The graph of FIG. 10 illustrates the values of the threshold bias table in FIG. 9 plotted against a sequential numbering of their positions in the table. An upper portion 101 of the line on the graph shows that each of the values that would not result in a dot when the input value has some low tone value X1, such as 14 in the example above, are still distributed in the same manner as FIG. 6 but shifted down to be centered around zero and scaled down by a factor of 4. However, a lower portion 103 of the line shows that the values in the threshold bias table that correspond to values in the threshold table that would result in a dot are only shifted down. Consequently, the slope in lower portion 103 is much steeper than the slope in upper portion 101. Upper portion 101 corresponds to an upper range of possible tone values. Lower portion 103 corresponds to a lower range of possible tone values.

Figures 11, 12:
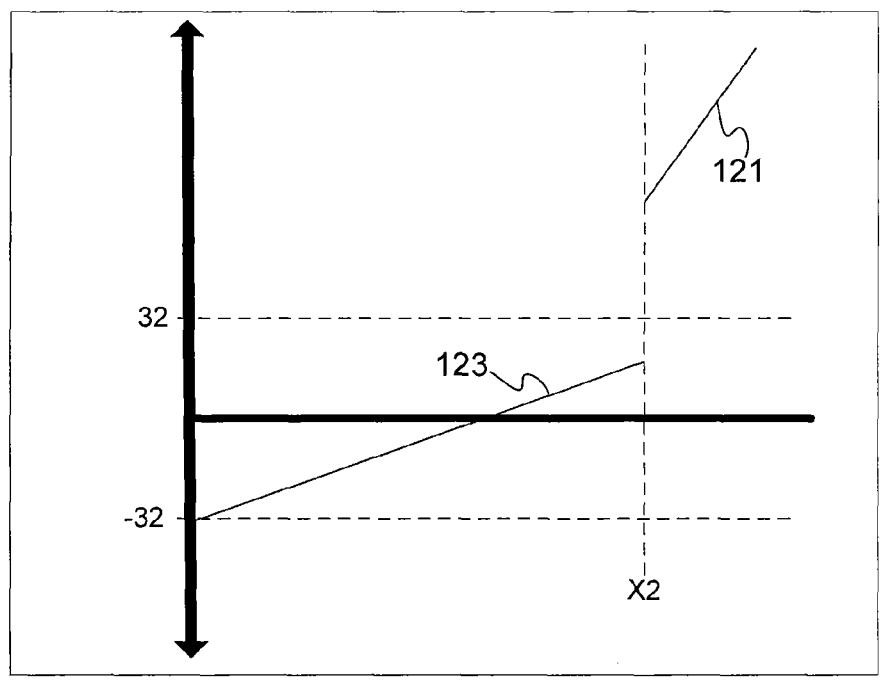
FIG. 11 illustrates an example of a threshold bias table for a dark tone value.
FIG. 12 illustrates a graph of the values of the entries in the threshold bias table of FIG. 11.

The opposite bias is applied when constructing threshold bias tables for the dark tones. FIG. 11 illustrates a threshold bias table for a dark tone value, for example 241. The threshold bias table for tone value 241 is generated in an opposite fashion to the threshold bias table for light tone values. For example, the threshold bias table is generated by starting with a table similar to the threshold table of FIG. 5, in which the values 1 to 255 are listed, subtracting 128, and then dividing the result by four, truncating the remainder or rounding the remainder. However, for the values that correspond to the dark tone value (241) or higher, the result is not divided. In other words, for the entries that correspond to the dark tone value (241) or higher, the value will remain on the −127 to 127 scale. A similar table could also be generated by scaling all values by a factor and adding a constant from the entries that correspond to the dark tone value (241) or higher.

The shaded rectangles in FIG. 11 illustrate which locations in the threshold bias table correspond to the dark tone value (241) or higher. Similar to FIG. 9, the shaded rectangles do not necessarily represent that a dot will not be placed in that location, but the shaded rectangles do indicate that those locations are much more likely to not receive a dot than the locations that are not shaded. In other words, the threshold value may be calculated as a function of the incoming tone value or as a function of both the incoming tone value and the location of the threshold value in the threshold bias table.

The graph of FIG. 12 illustrates the values of the threshold bias table in FIG. 10 plotted against a sequential numbering of their positions in the table. A lower portion 123 of the line on the graph shows the values that would result in a dot when the input value has some high tone value X2, such as 241 in the example above. The values of lower portion 123 are distributed in the manner of FIG. 6 but shifted down to be centered around zero and scaled down by a factor of 4. An upper portion 121 of the line on the graph shows that each of the values that would not result in a dot when the input value has some high tone value X2, such as 241 in the example above, is only shifted down. Consequently, the slope in upper portion 121 is much steeper than the slope in lower portion 123. Upper portion 121 corresponds to an upper range of possible tone values. Lower portion 123 corresponds to a lower range of possible tone values.

The algorithm for constructing a threshold bias table for light tones, as discussed in reference to FIGS. 9 and 10, is used when the incoming tone is equal to or below a light tone threshold value. The algorithm for constructing a threshold bias table for dark tones, as discussed in reference to FIGS. 11 and 12, is used when the incoming tone is equal to or above a dark tone threshold value. The algorithm for constructing a threshold bias table for midtones, as discussed in reference to FIGS. 7 and 8, is used when the incoming tone is between the light tone threshold value and the dark tone threshold value. In all cases, the values of the threshold bias table are added to the values of a threshold table, such as the one shown by FIG. 5, to bias or perturb the values of the threshold table so that the incoming tone value is compared to threshold values adjusted in real time as a function of the incoming tone value.

Figure 13:
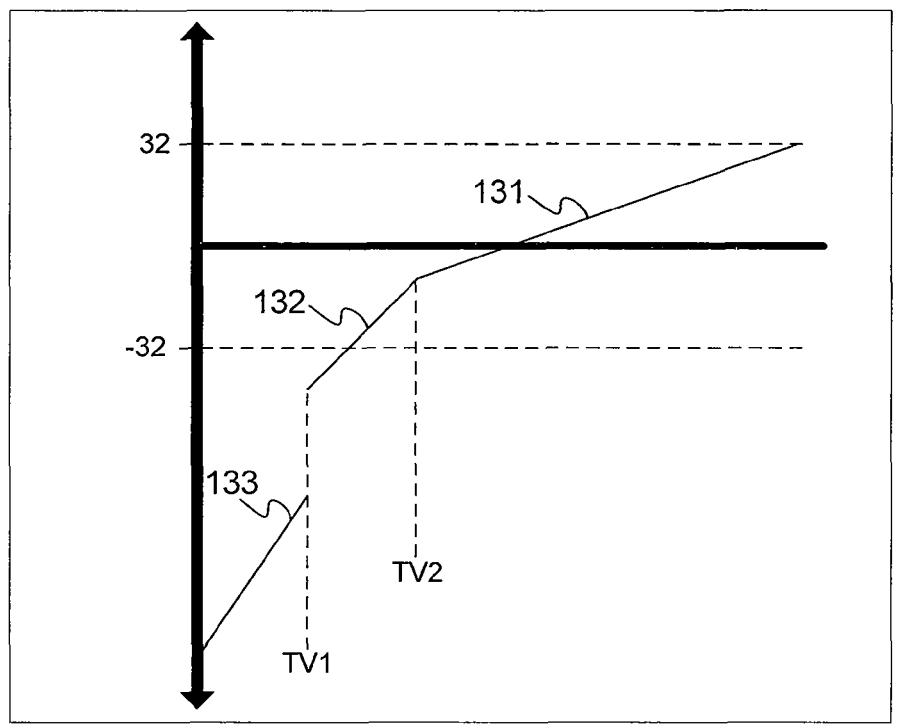
FIG. 13 illustrates a graph of the values of the entries in another threshold bias table for a light tone value.

FIG. 13 illustrates a graph that would correspond to a threshold bias table for a light tone using a more complex function. For example, in FIG. 13, the entries below TV1 at lower portion 133 remain on the −127 to 127 scale. The entries above the first point TV2 at upper portion 131 are scaled by dividing by 4 as discussed above. The entries below a first point TV2 and above a second point TV1 at middle portion 132 may be scaled using a second scaling factor. In other words, the function of input tone is defined with a first slope when the tone value is greater than a critical tone value and a second slope when the tone value is less than the critical tone value.

Figure 14:
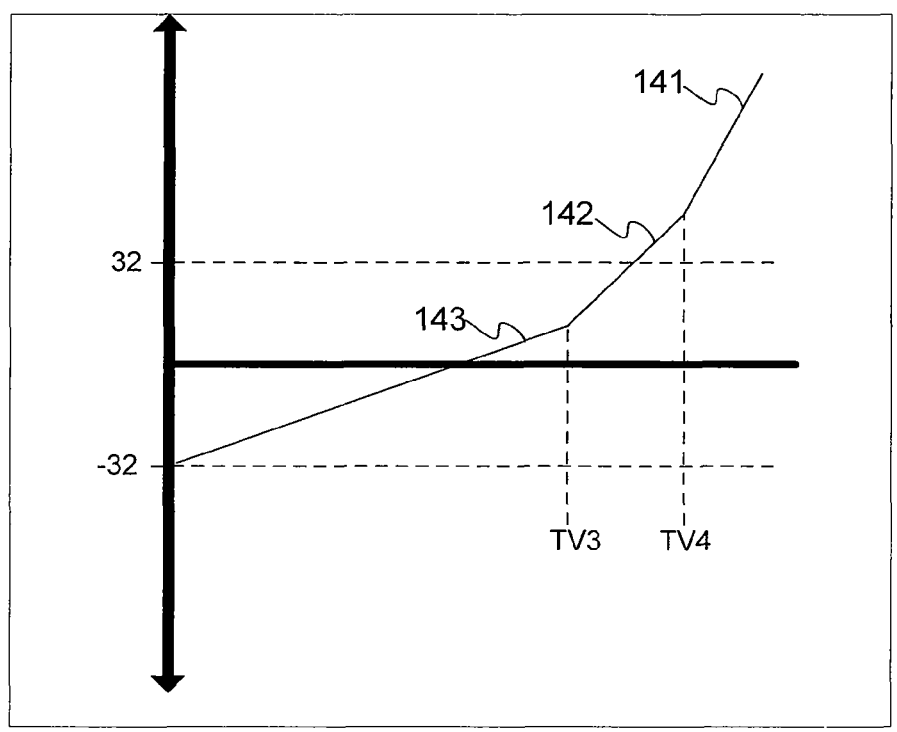
FIG. 14 illustrates a graph of the values of the entries in another threshold bias table for a dark tone value.

Likewise, FIG. 14 illustrates another type of complex function used for a dark tone value. In this example, none of the values remain on the −127 to 127 scale. Instead, scaling is performed on the entries below the first point TV3 at lower portion 143 using a first scaling factor. A second scaling factor is used on the entries above a first point TV3 and below a second point TV4 at middle portion 142. A third scaling factor is performed on the entries above the second point TV4 at upper portion 141. In other words, the function of the input tone is defined with a first slope, a second slope, and a third slope.

In the example shown in FIG. 14, the third slope is greater than the second slope, and the second slope is greater than the first slope. The first slope occurs where the tone value is greater than a first critical tone value. The second slope occurs where the tone value greater than the first critical tone value but less than a second critical tone value. The third slope occurs where the tone value is greater than the second critical tone value. In both examples, the critical values are predetermined based on the incoming tone value or calculated based on the incoming tone value.

Figure 15:
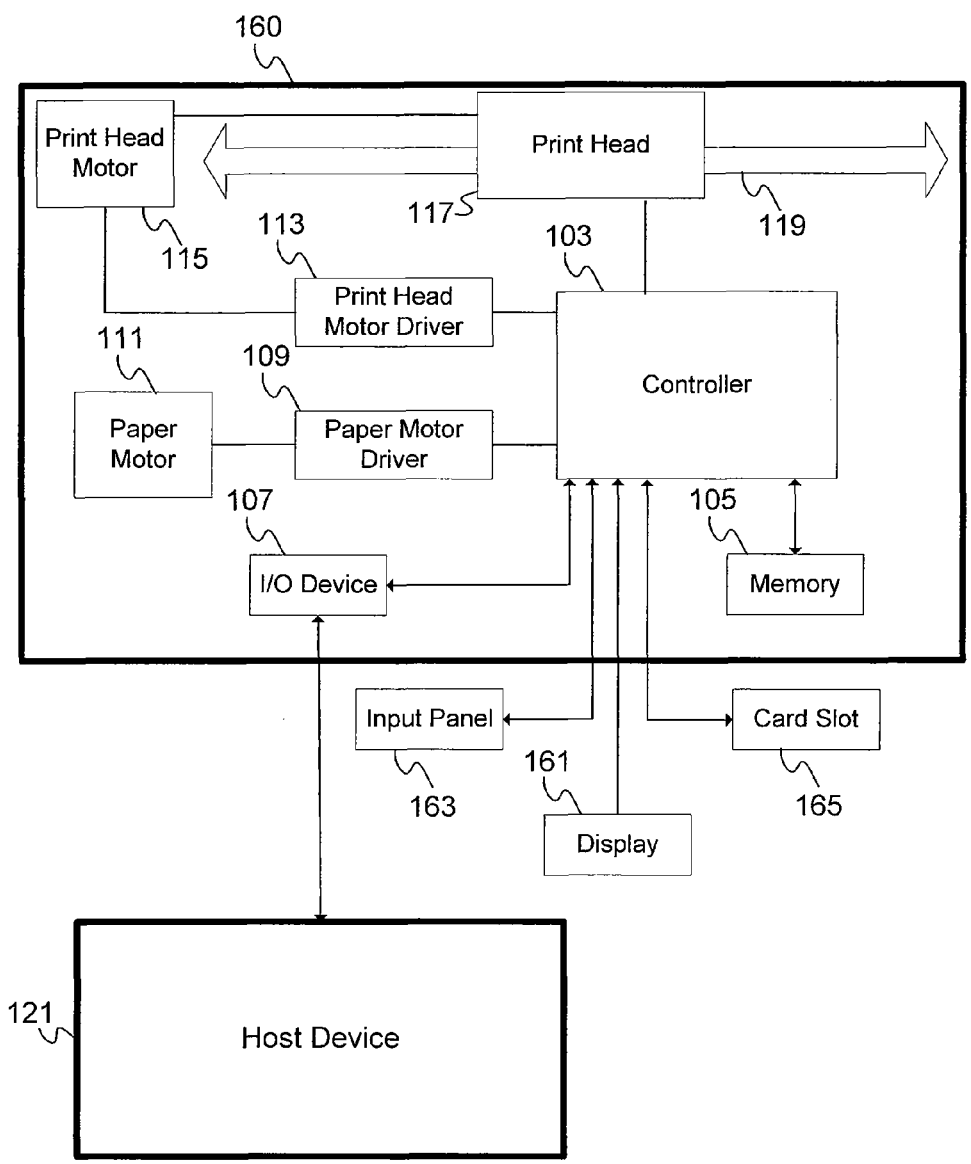
FIG. 15 illustrates another implementation of a printer embodying the tone dependent threshold perturbation error diffusion halftone.

FIG. 15 illustrates another implementation of a printer embodying the tone dependent threshold perturbation error diffusion halftone. Printer 160 includes many of the same features discussed above with reference to FIG. 3. Printer 160 also includes an input panel 163, a display 161, and a card slot 165. The display 161 may be an LCD panel or combined with the input panel 163 as a touch screen interface. Card slot 165 may receive information of the input image from a card inserted by a user. For example, the card may be a flash memory usable with a digital camera, PDA, or digital reader.

The input panel 163 includes a keypad and/or other buttons or sliders than enable a user to input information to printer 160. The input panel 163 may permit the parameters of the halftone panel to be selected. For example, tone dependent threshold perturbation error diffusion halftone may be selected, the number of entries or the distribution for error diffusion may be selected, the colors to be used in halftoning may be selected, the magnitude of the maximum threshold entries may be selected (for example, +/−32, +/−40, or +/−64), and/or the magnitude of the bias for light and/or dark tones may be selected.

The user does not need to make direct selection of the halftoning parameters on the input panel 163. Instead, the user input panel 163 may present more user-friendly options, such as a document type selector, including options for text, text/graphic, and photograph, or a contrast (light/dark) selector. The user can select one of the user-friendly options presented on the user input panel 163. The controller 103 can additionally be configured to convert these types of input received at user input panel 163 to the appropriate halftoning parameters. The conversion between user-friendly settings and halftoning parameters may be stored in memory 105 by a user setting lookup table. The conversions stored in the user setting lookup table may be determined by a survey given to potential users who simply view images printed with different halftoning settings for the various types of images (text, text/graphic, and photograph at varying contrasts) and select the image that is the most aesthetically pleasing.

Figure 16:
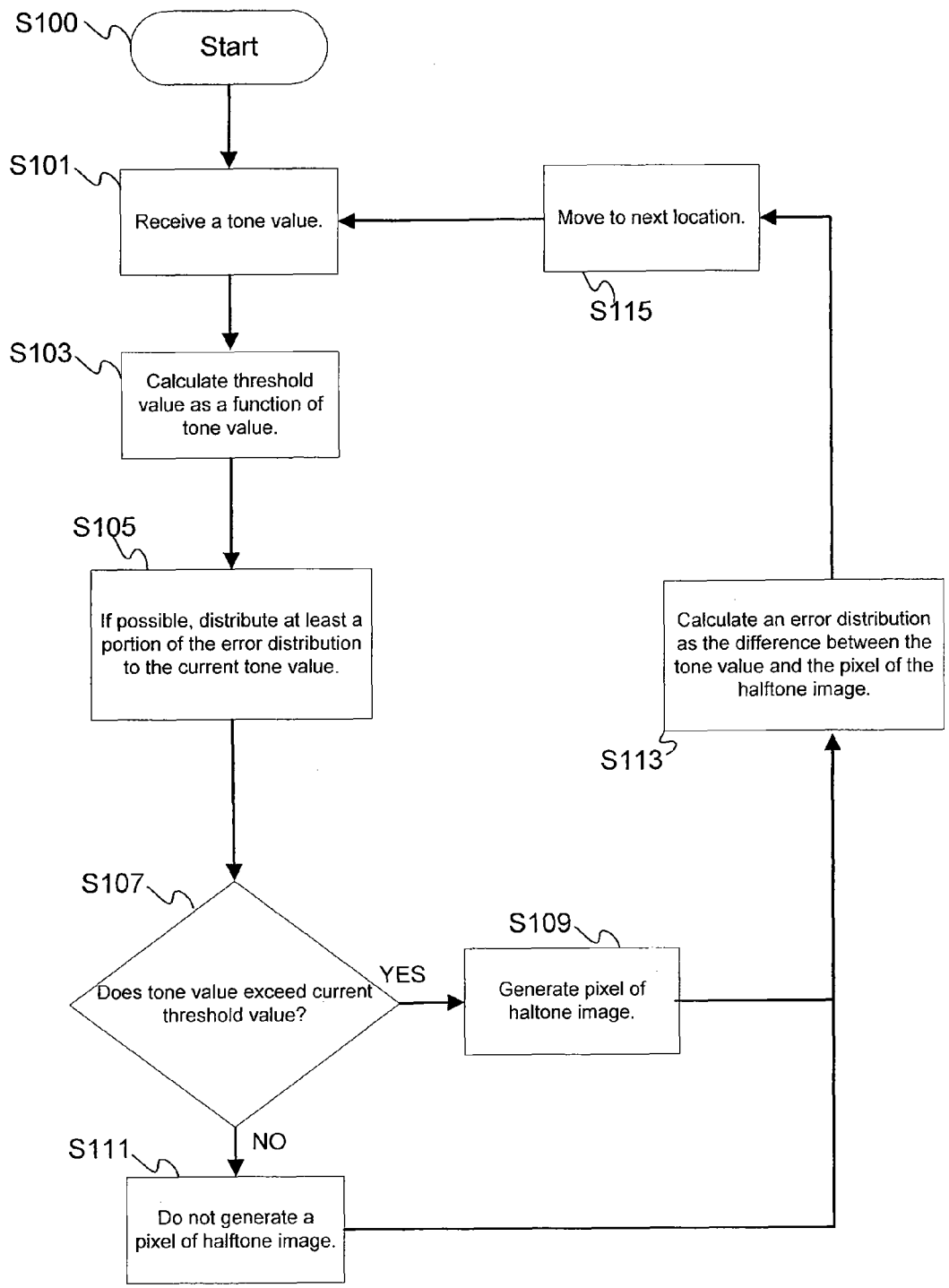
FIG. 16 illustrates a flow chart for the tone dependent threshold perturbation error diffusion halftone algorithm.

FIG. 16 illustrates the tone dependent threshold perturbation error diffusion halftone algorithm. The algorithm begins at S100. At S101, the processor receives a tone value that corresponds to a pixel of the input image. In a color system, the tone value may correspond to a pixel of a particular color plane. At S103, the halftone module 203 generates a threshold bias table as a function of the tone value. The halftone module 203 may have already generated the threshold bias table before the tone was received. At S105, if possible, the halftone module 203 distributes at least a portion of the error distribution to the current tone value. Such a distribution may not be possible if the first pixel is being processed, error distribution has been turned off for that pixel, or there was no error distributed to that pixel because none existed. At S107, the halftone module 203 determines whether the tone value exceeds the corresponding entry in the threshold table. If it does, a dot is generated for that pixel in the halftone image at S109. If it does not, no dot is generated for that pixel in the halftone image at S111. Then, the halftone module 203 calculates an error distribution as the difference between the tone value and the pixel of the halftone image at S113. Some or all of the error distribution will be applied to one or more future pixels. At S115, the halftone module 203 begins to analyze the next pixel and the algorithm repeats.

Figure 17:
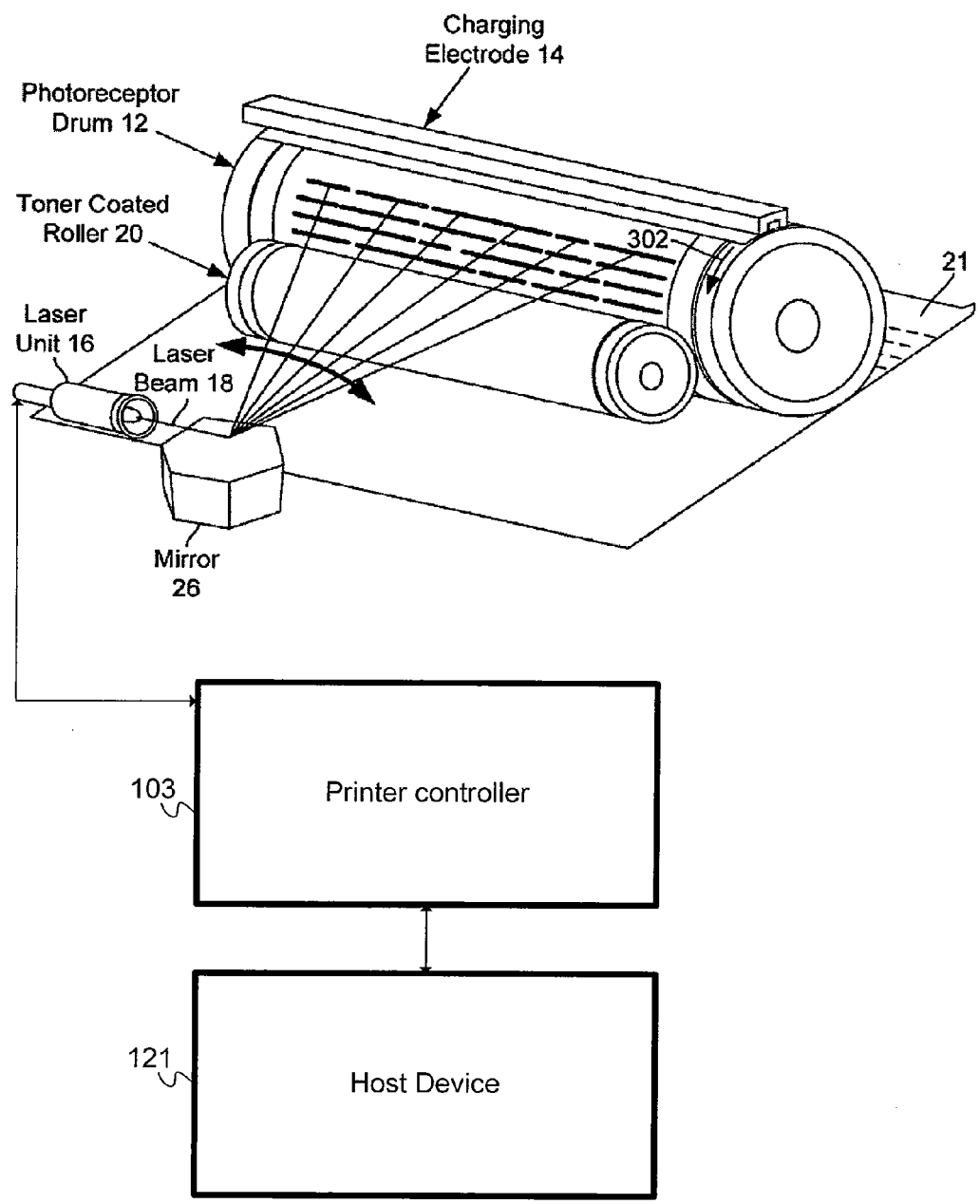
FIG. 17 illustrates an implementation of an electrophotographic image forming apparatus embodying the tone dependent threshold perturbation error diffusion halftone.

FIG. 17 illustrates an implementation of an electrophotographic image forming apparatus embodying the tone dependent threshold perturbation error diffusion halftone. The term electrophotographic image forming apparatus includes at least laser printers, photocopiers, and combinations thereof such as MFPs. The printer controller 103, as discussed above, controls laser unit 16 as a printing device. Polygon mirror 26 is controlled by a driver (not shown). The laser unit 16 directs the halftone image via laser beam 18 to expose portions of photoreceptor drum 12 which has been charged by charging electrode 14, creating an electrostatic image. Toner coated roller 20 delivers toner to the photoreceptor drum 12 which adheres to the electrostatic image. The toner is delivered to recording medium 21 and fixed by a heating roller (not shown). Arrow 302 indicates the direction of the photoreceptor drum 12.

In addition to the ink-based printer shown in FIG. 3 and the toner-based (laser or electrophotographic) printer shown in FIG. 17, other printing technologies may utilize the tone dependent threshold perturbation error diffusion halftone described above. For example, dye-sublimation may be used, which heats dye to transfer an image to a print medium. The dye may be transferred from a ribbon. Alternatively, thermal transfer printing may be used, in which a coating of ribbon is melted so that the ribbon stays glued to the recording medium.

Additionally, the tone dependent threshold perturbation error diffusion halftone described above may be used in processing an image for a display, such as an LCD or CRT monitor or television.

Tone Dependent Initial Error Terms for Halftoning

Figure 1:
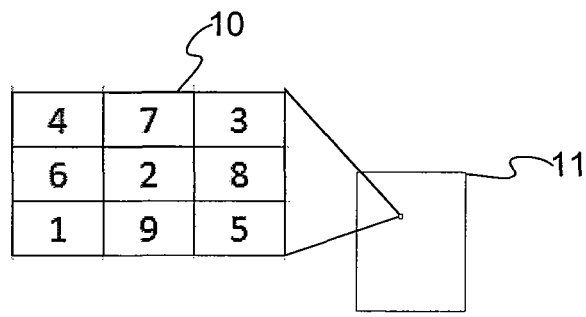
FIG. 1 illustrates a conventional threshold table.
Figure 2:
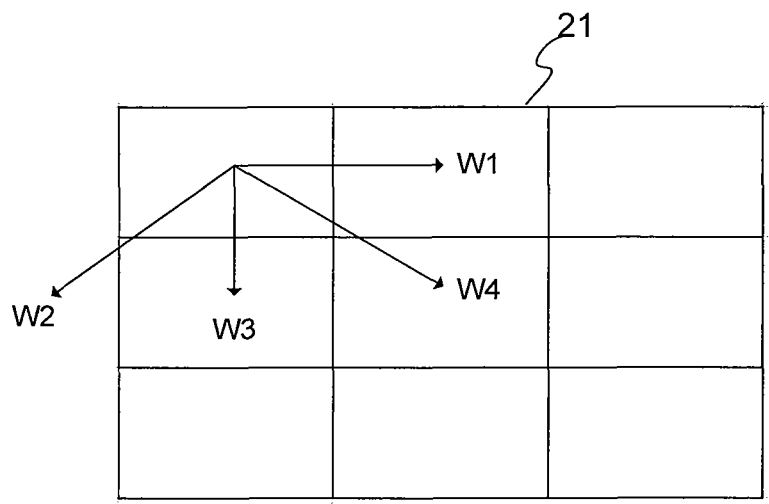
FIG. 2 illustrates a conventional error distribution table.

As discussed above with respect to FIG. 2, error diffusion involves carrying an error value from one pixel forward for use in the calculation of future pixels. Generally, the difference between the incoming tone and the binary output (dot printed/no dot printed) is calculated as an error. FIG. 2 illustrates an example of an error diffusion table 21, in which a set of weights are used to distribute the error from a single pixel's halftone decision (W1, W2, W3, and W4). The weights determine how the error is diffused to other pixels.

For example, error diffusion table 21, in which only 9 pixels are illustrated in FIG. 2, may be part of a much larger image. At each pixel, there is a threshold value. For the sake of simplicity, the threshold value may be 128 for every pixel and the incoming tone value may be 5 (approximately 2% of the possible 255) for the entire image.

The first incoming tone (5) is compared to the threshold value of 128. Because 5 is lower than 128, no dot will be placed at this pixel. The absence of a dot is effectively a pixel value of 0. The desired tone value was 5. Therefore, the first pixel resulted in an error of 5 (5−0), which will be propagated into future pixels.

As noted above, the entire error may be propagated into the subsequent pixel. Alternatively, the error may be allocated in any number of different allocation schemes. For example, the error could be spread to the subsequent pixels and the neighboring three pixels in the next line, as shown by FIG. 2. The weight of the distribution could be W1=½, W2=⅙, W3=⅙, and W4=⅙, or any other distribution. In another example, the error may be distributed to a different number of pixels, such as the next 20 pixels or the 12 pixels that include two layers of neighboring pixels.

Continuing the example above, the incoming tone value may be 5, resulting in an error of 5 to be propagated forward to subsequent pixels. Even if all of the error is propagated to the next pixel, the threshold value of 128 will be compared to 10 (5 from the incoming tone value+5 from the propagated error), which will still result in no dot being printed. The total error of 10 will now propagate to the third pixel. However, the value of 15 (5 from the incoming tone value+10 from the propagated error) will still result in no dot being printed.

As this pattern follows, it will become apparent that for certain light tones, the first few pixels or lines of pixels (depending on the error distribution allocation) will necessarily be a blank space (no dots are printed). Likewise, for certain dark tones, the first few pixels or lines of pixels (depending on the error distribution allocation) will necessarily be printed dots with no blank space. Eventually, the error diffusion algorithm balances and a more random arrangement emerges.

Figure 18:
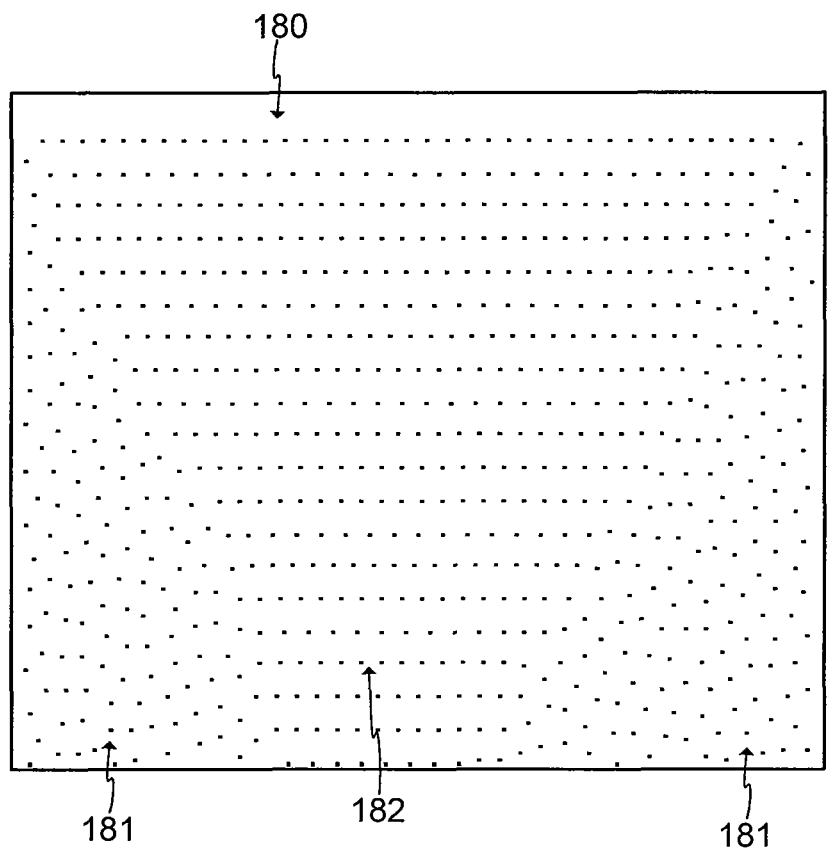
FIG. 18 illustrates an image produced with no initial error terms.

For example, FIG. 18 illustrates an image produced from a constant incoming tone of 5 and no initial error terms. A dot will not be placed until the error from the first few pixels or lines of pixels builds up to a value near the threshold value of 0. Therefore, the top portion 180 of the image will be a blank space. Eventually, a dot will be printed and a regular pattern of dots emerges, as shown in the center portion 182 of FIG. 18. As the error diffusion algorithm progresses, a more random and aesthetically pleasing pattern of dots will be produced, as shown in side portions 181 of FIG. 18. Generally speaking, the error diffusion algorithm reaches a steady state before it produces the best possible image.

Tone dependent initial error terms allow the error diffusion algorithm to reach a steady state more quickly. As discussed above, since the first few pixels or first few lines do not have any error terms from the previous lines, they will behave differently than subsequent lines. If initial terms are added to the first few pixels or the first few lines of pixels, the steady state portion of the image can be reached more quickly. The error terms should be filled with values that are similar to what will be encountered on subsequent lines.

The following error diffusion techniques are discussed in reference to the printer of FIGS. 3 and 4, but may also be used with the printers of FIG. 15 or FIG. 17. In addition, the error diffusion techniques may be implemented by a display, such as a television or monitor, which may employ LCD, CRT, Plasma, or LED technology.

One simple solution is to add a random error to the error terms of the first few pixels or first few lines of pixels. For example, halftone module 203 may generate a random number in a predetermined range to serve as an initial error term for the first few pixels. The predetermined range may be the average of a typical image. For example, the predetermined range may be +/−32 or +/−64.

Figure 19:
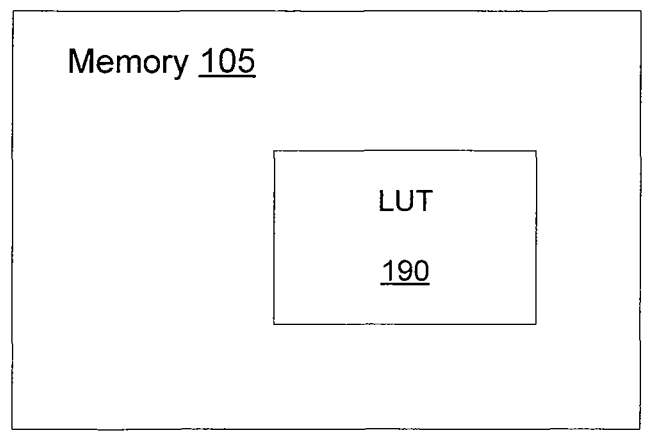
FIG. 19 illustrates another implementation of the printer of FIG. 3.

In another solution, the halftone module 203 selects the initial error term for each pixel based on the incoming tone value. As discussed above, memory module 207 accesses memory 105. As shown in FIG. 19, memory 105 includes a lookup table 190 that indexes each possible incoming tone value, e.g. 0 to 255, against at least one statistical parameter. The halftone module 203 uses the at least one statistical parameter to define a set of data from which an initial error term is selected. The statistical parameters include a mean, a standard deviation, or both.

For example, for a particular incoming tone value, the lookup table 190 lists a standard deviation of 10 and a mean of 30. The halftone module 203 selects an initial error term randomly from a data set that has a standard deviation of 10 and the mean of 30. The data set may be selected to be within a certain number (e.g. two or three) of standard deviations of the mean. The data set may have either a normal distribution or a Gaussian distribution.

Memory 105 stores a lookup table 190 of incoming tone values, indexed against a standard deviation and mean, that can be used to generate a random number. The random number can then be used for an initial error term for the particular incoming tone value.

The standard deviation and mean for each tone value may be calculated from test data of error terms generated by processing an image having a constant input tone value and analyzing the error term values when the processed image reaches a steady state. The test data of error terms varies as a function of the constant input tone value. The test data of error terms also varies as a function on the amount of threshold perturbation that is included in the error diffusion algorithm.

Figure 20:
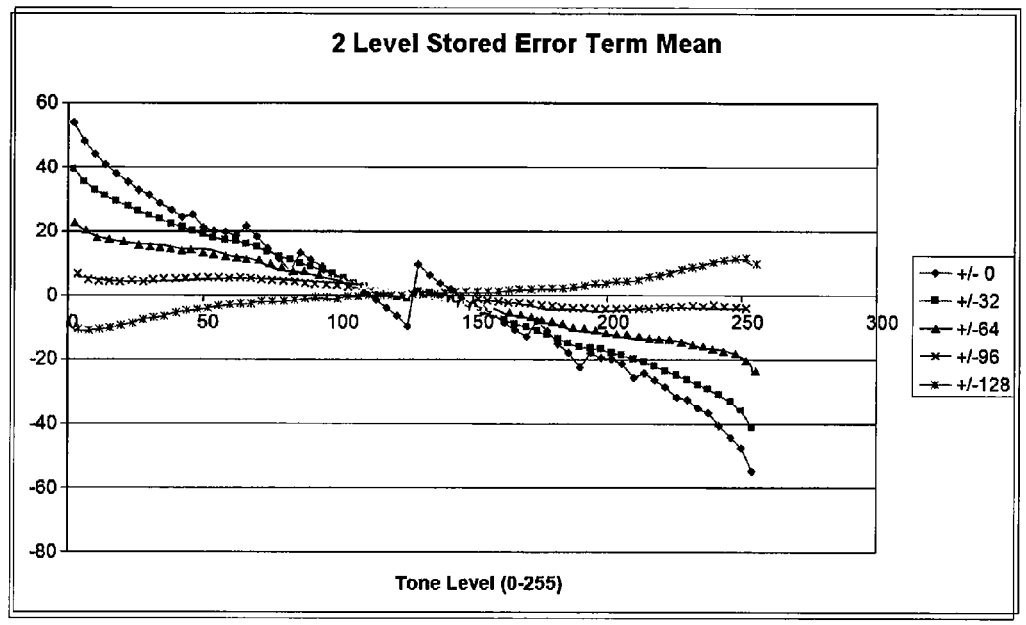
FIG. 20 illustrates a graph of the mean error term values associated with the possible incoming tone values.

FIG. 20 illustrates a graph of the mean error term values associated with the possible incoming tones. The mean error term values are generated by processing a continuous tone test image for each possible tone. Each line illustrated in FIG. 20 is for a different set of possible threshold perturbations. The line labeled +/−0 does not include any threshold perturbation. Each point on the line generally represents a possible incoming tone value. In other words, in order to build each of the lines in the graph of FIG. 20, a continuous tone image for each of the possible tone values (0 to 255) was processed. The lines labeled +/−32, +/−64, +/−96, and +/−128 correspond to sets of continuous tone images using threshold perturbation based on white noise in ranges defined by those values. In all of the cases shown in FIG. 20, a simple 1 bit per pixel output error diffusion is used.

Figure 21:
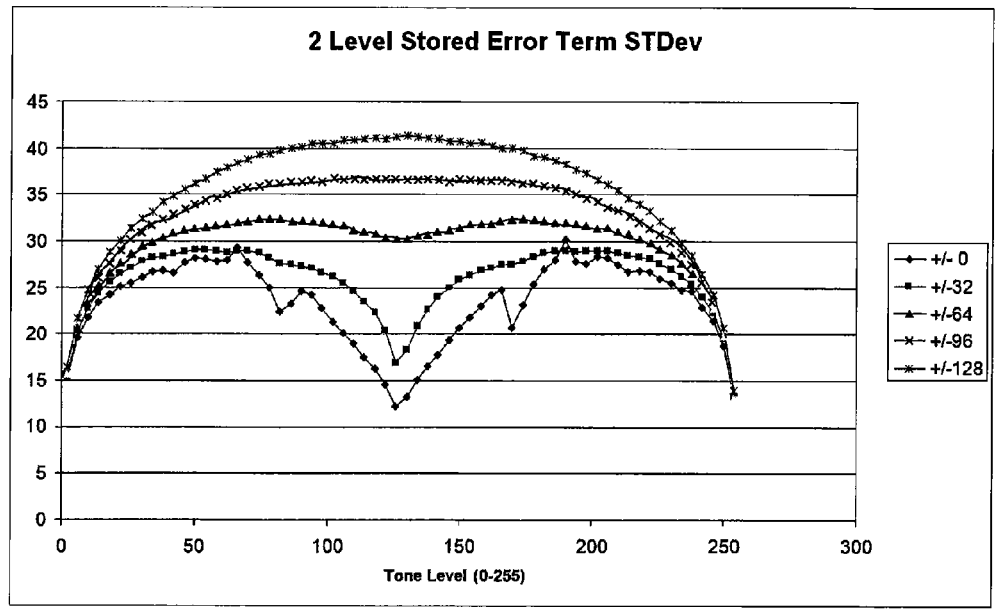
FIG. 21 illustrates a graph of standard deviations associated with the possible incoming tone values.

As can be seen from FIG. 20, the mean of the errors for a midtone tone is close to 0, and the mean of the errors for a very dark tone are negative. When the threshold is perturbed by a white noise in the range of +/−96 to +/−128, the mean is fairly insensitive to the incoming tone level. FIG. 21 illustrates the standard deviations of the sample data from FIG. 20. Examining the standard deviation of the error terms in FIG. 21, the tone value still has a significant influence on the standard deviation of the error terms. Thus, even though the tone may not have much effect on the error mean with white noise threshold perturbation at levels of +/−96 to +/−128, there is still a strong effect on the standard deviation. For very light and very dark tones, the standard deviation is significantly less than for midtones.

Some of the data from the graphs in FIGS. 20 and 21 may be stored in lookup table 190 so that initial error terms may affect incoming tone values. When an incoming tone value is received, the memory module 107 accesses the lookup table 190 in memory 105 for the standard deviation and the mean, such as the mean and standard deviation illustrated in FIGS. 20 and 21. As shown in FIGS. 20 and 21, in the case that no threshold perturbation is used (lines labeled +/−0) and the incoming tone is 50, the mean is approximately 20 and the standard deviation is approximately 28. Therefore, in this example, for every pixel location where the incoming tone value is 50, the halftone module 203 randomly selects a value from a data set with a mean of 20 in the range of 2 standard deviations (2×28=56), which extends from −36 to 76. Alternatively, a different number of standard deviations could be used.

In another example, a predetermined standard deviation may be used for all incoming tone values. In this case, the halftone module 203 selects an initial error term from a data set having a mean based on the incoming tone value in a range based on the predetermined standard deviation. FIG. 21 shows that for several threshold perturbation possibilities, the standard deviation curve is substantially horizontal across a majority of possible tone values. This illustrates that a constant or predetermined standard deviation is a fair approximation for several threshold perturbation possibilities.

Figure 22:
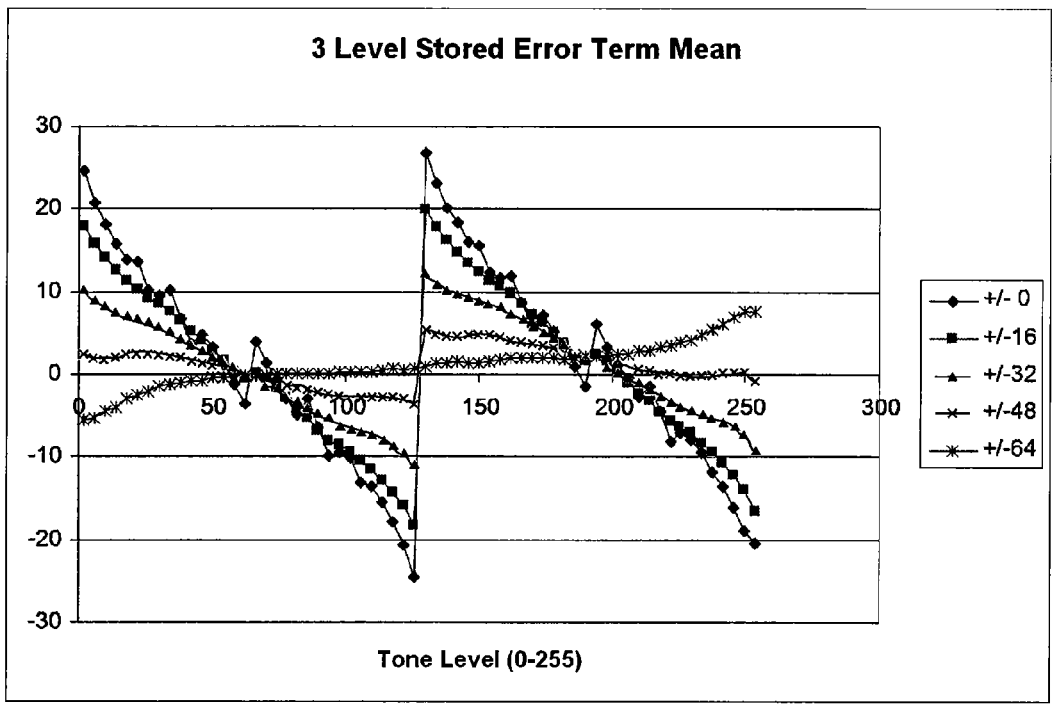
FIG. 22 illustrates mean errors for five different degrees of white noise threshold perturbation in a three-output level error diffusion.
Figure 23:
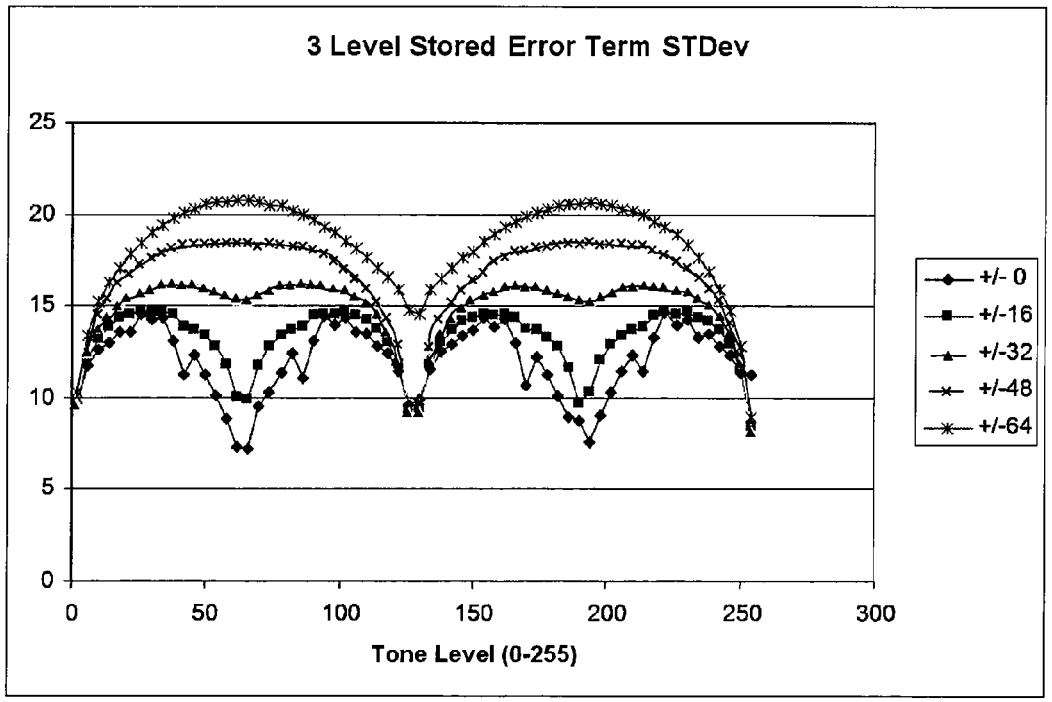
FIG. 23 illustrates standard deviations for five different degrees of white noise threshold perturbation in a three-output level error diffusion.

FIGS. 22 and 23 illustrate another set of analyzed data for error terms using three output data. That is, instead of the pixels either being 0 (no dot) or 1 (dot), the pixels have three values. For any given incoming tone value and threshold perturbation range, a mean value may be derived from FIG. 22 and a standard deviation may be derived from FIG. 23.

With more levels, there are now repeating patterns in the plots. This emphasizes that for many error diffusion implementations, there is significant sensitivity of the error terms to a constant level of input. Typically for input tones of 0 and 255 (minimum and maximum), no error terms are generated; therefore, a value of 0 would be sufficient.

Figure 24:
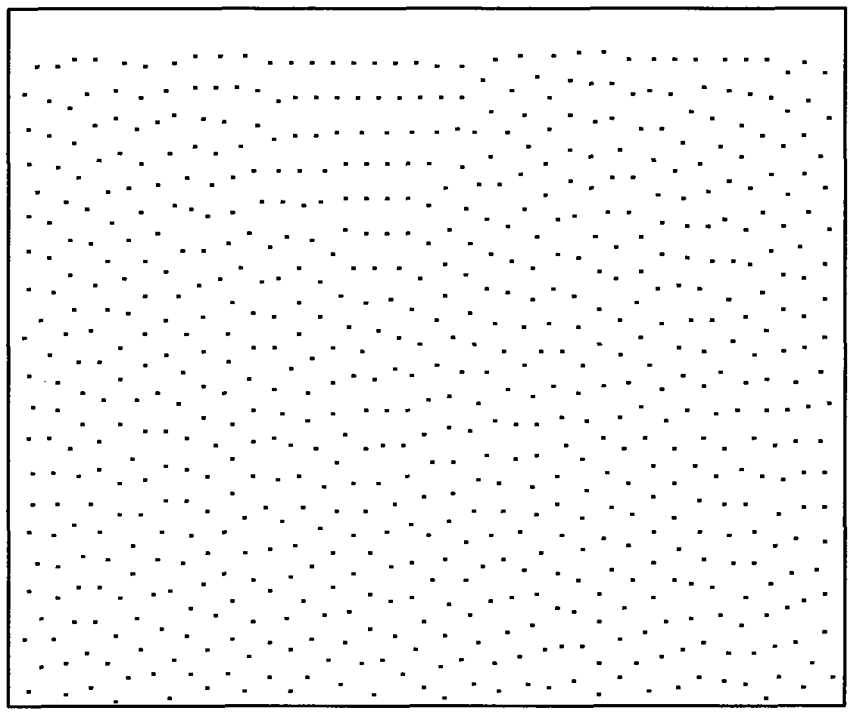
FIG. 24 illustrates an image produced with initial error terms.
Figure 25:
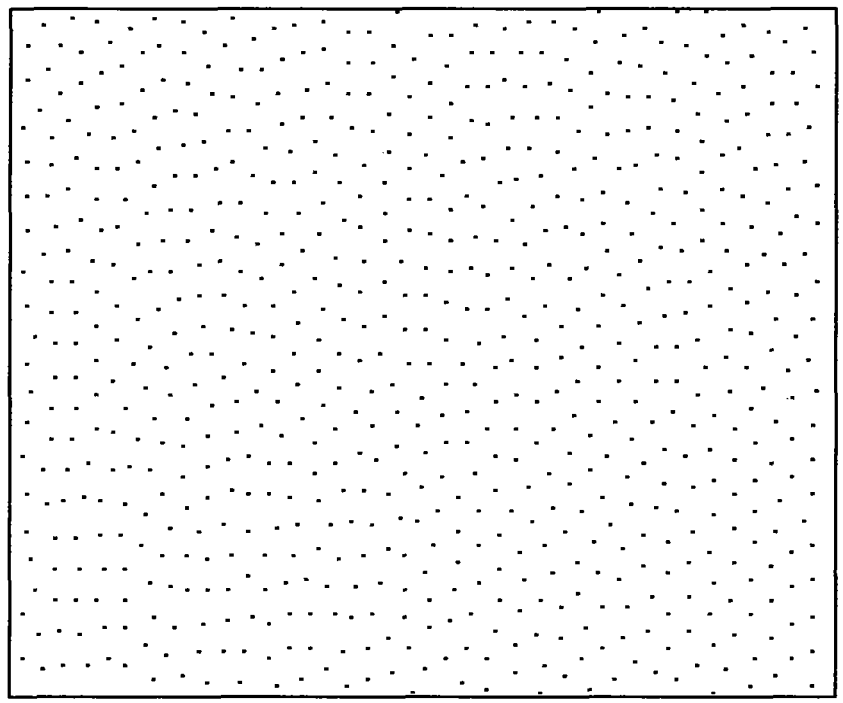
FIG. 25 illustrates another image produced with initial error terms.

The error terms may be pre-loaded for the first line with error terms that are similar to what will be generated in the rest of the image. This can significantly reduce the start-up artifacts in an image. For example, a simple 1 bit per pixel output image generated from a constant gray value of 5 (out of 255) produces an image with the initial error terms set to 0, as shown in FIG. 18. By pre-loading the error terms with random error values (within the range of +/−32), the output appears more random, as shown by FIG. 24. However, with an offset of 40 added to the random error values, the early portion of the image is not filled with blank space, as shown by FIG. 25.

When a multi-color image is used, using a cyan, magenta, yellow, and black (CMYK) or other color system, the initial error terms may vary among colors. If the same initial error term is used for each color, a pattern may emerge. However, halftone module 203 may still utilize the same statistical parameters when generating the initial error terms for the various colors, but a new initial error term can be generated for each color. Distributions other than white noise can be used for threshold perturbation. The algorithms can be evaluated to determine what differences these different distributions have on the desired initial error terms. The initial error terms can be generated by software/firmware that examines the initial line of the image so that the hardware automatically generates the data without the software/firmware looking at the image data.

Figure 26:
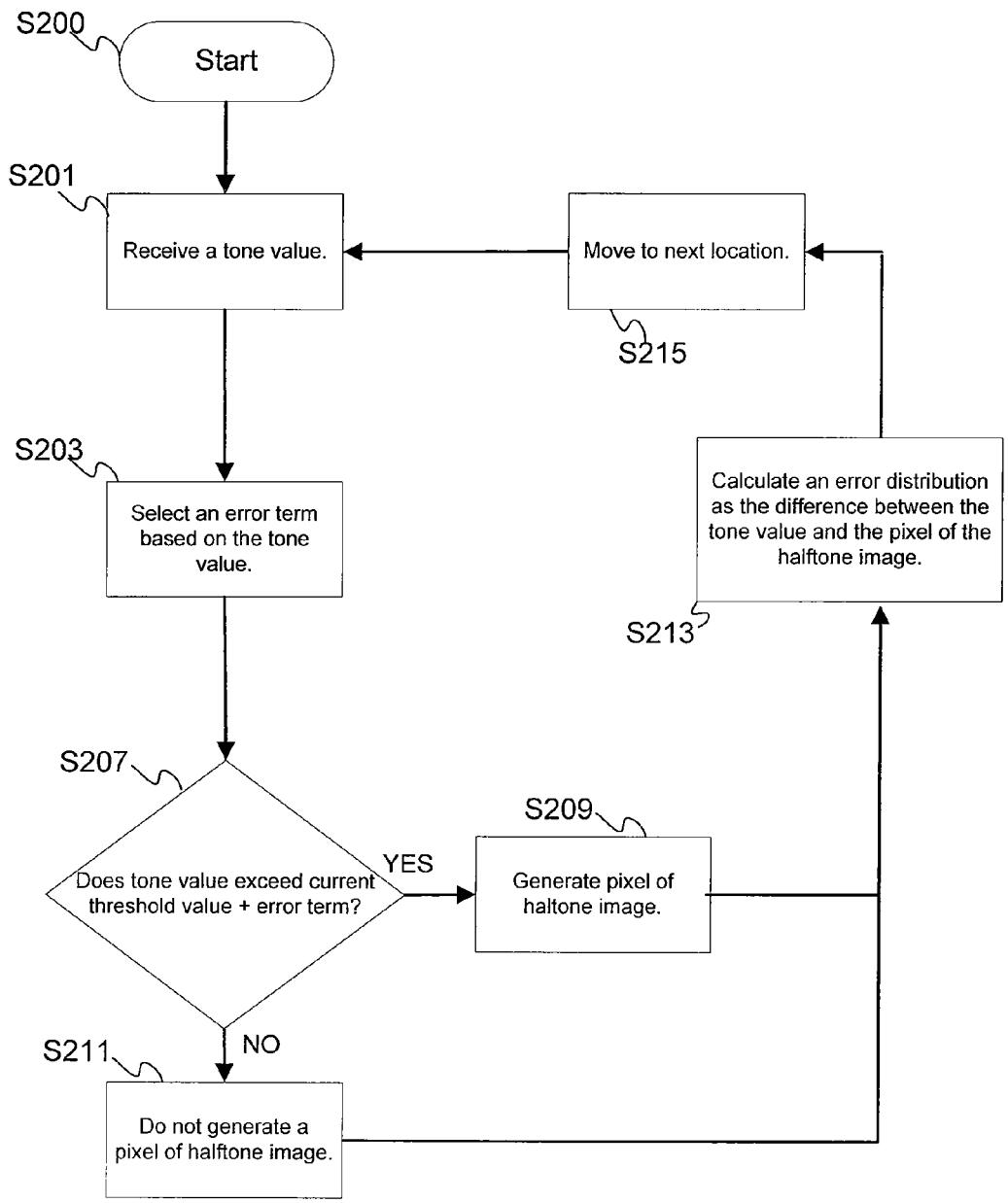
FIG. 26 illustrates a flow chart for an error diffusion halftone algorithm using tone dependent initial error terms.

FIG. 26 illustrates a flow chart for an error diffusion halftone algorithm using tone dependent initial error terms. The algorithm begins at S200. At S201, the processor 201 receives a tone value that corresponds to a pixel of the input image. At S203, the halftone module 203 selects an error term based on the tone value. As discussed above, the error term may be randomly selected from data generated from a mean and standard deviation. At S207, the halftone module 203 determines whether the tone value exceeds the corresponding threshold value adjusted by the error term. The threshold value may additionally be adjusted by threshold perturbation, as described above. If the incoming tone value exceeds the adjusted threshold value, a dot is generated for that pixel in the halftone image at S209. If it does not, no dot is generated for that pixel in the halftone image at S211. Then, the halftone module 203 calculates an error distribution (for subsequent pixels) as the difference between the tone value and the pixel of the halftone image at S213. Some or all of the error distribution is applied to one or more subsequent pixels. At S215, the halftone module 203 analyzes the next pixel, and the algorithm repeats. Alternatively, the error diffusion halftone algorithms could be performed by a host device, such as a personal computer, in communication with the printer.

Pixel Stacking Avoidance Halftoning

As discussed above, error diffusion can sometime result in visual artifacts noticeable to the human eye. These visual artifacts may be reduced through serpentine traversal, various fixed values of error term weights, threshold perturbation, and tone dependent changes to the error term weights.

In multi-color print systems, the error diffusion algorithms discussed above are generally performed for each color independently in a color plane. The color plane is the data space where the halftoning calculations occur. The color planes of the multicolor image may be visualized as a color layer for each color stacked to form a multicolor image. Each color plane is associated with a separate threshold table, as shown in FIG. 5.

In multi-color print systems, the error diffusion algorithms do not consider how the generated dots of each color align with regard to each other. If the same algorithms are executed on each color plane, there is a significant correlation among the color planes.

If the stream of incoming values for two or more colors are fairly light, there is a relatively high likelihood that a dot for each color will be placed in the same pixel (or nearby pixels), and the algorithm will leave a large amount of black space in the surrounding area. Likewise, if the stream of incoming values for two or more colors is fairly dark, there is a relatively high likelihood that isolated black spaces for each color will be surrounded by a large amount of area with both colors. This correlation among the color planes causes the image to appear grainy. It is useful to spread the color pixels out from each other based on the positions of color pixels in each of the color planes.

The following error diffusion techniques are discussed in reference to the printer of FIGS. 3 and 4, but may also be used with the printers of FIG. 15 or FIG. 17. In addition, the error diffusion techniques may be implemented by a display, such as a television or monitor.

With reference to FIG. 3, the printer may be configured to implement a pixel stacking avoidance (PSA) function. Controller 103 may access the PSA function from the memory 105 and perform calculations using a halftone module 203 or processor 201. Although, the PSA function is discussed in terms of halftone module 203, processor 201 may perform the PSA function. The PSA function considers whether any color has been or will be generated (the combination of all color planes), unlike conventional systems which consider only the color in a single plane.

In multicolor halftoning, the halftone module 203 (or processor 201) processes a color plane for each color. Each color plane includes a threshold table, such as discussed above in reference to FIG. 5. Through error diffusion, the halftoning decision for one pixel affects the halftoning decisions for subsequent pixels. These influences occur horizontally or within the same color plane. The PSA function allows the halftoning decisions to influence other color planes. These influences occur vertically or across color planes in the same pixel.

The color planes may be cyan (C), magenta (M), and black (K). Additional color planes, such as yellow (Y), may be included. However, yellow contributes much less to visual artifacts in a printed or displayed image because it is far less visible to the human eye than cyan, magenta, and black. Alternative color planes, such as red-green-blue, may be included.

The PSA function acts to lessen the likelihood that more than one color plane generates color in an area without much color. In other words, in a large field of blank space, more than one color will not be added in the same pixel or the same area of pixels. The PSA function also increases the likelihood that other color planes will generate color when one of the planes does not produce color in areas with large amounts of color. For example, if the halftone module 203 in a three color system has the option of including color in a pixel or not (1 bit per pixel error diffusion output, 8 bit per pixel input per color, and a request for a value of 3 out of 255), the result is that 1% of the pixels are filled with color. For example, in a 10×10 array of pixels, only about 1 pixel would have color. If all three color planes include their respective colors in the same pixel location, the result is much more noticeable (grainy) than if the color planes had chosen different locations.

First, the halftone module 203 determines an order for the color planes. The outcome (decision) of the halftone module 203 for each color plane will influence the halftone module 203 in the next and subsequent color planes. For certain input tones, the process will be less likely to place dots at or near the same location. The halftone module 203 performs error diffusion halftoning in each color plane individually. The order of the color planes may be determined in real time (in a page by page, line by line, or pixel by pixel basis) based on the quantity and/or intensity of the color in each color plane.

For each pixel location, the halftone module 203 determines the likelihood that each of the colors will be used in the pixel location. The likelihood correlates to a value for each color at the given pixel. The order that halftoning is performed on the colors is determined by this likelihood. Halftoning is performed first on the color plane with the highest likelihood, then on the color plane with the next highest likelihood, and so on.

The outcome of the halftone is used to apply influence on the next halftone decision. An influence term is accessed from a PSA lookup table stored in memory 105 and updated based on the decision and the input tone value. This influence term can raise or lower the effective threshold of the error diffusion decision, which either increases the likelihood or decreases the likelihood that subsequent colors will be printed in the current pixel. In this way, the decision of halftone module 203 for each plane affects all of the subsequent color planes. To extend the influence of these decisions, the sum of all of the influences for this pixel are distributed to surrounding pixels, as discussed above similar to that shown by FIG. 2. A portion is distributed to the next pixel over and to several pixels below the current pixel. For subsequent pixels, even the first color plane is influenced by the decision of the pixels above. This procedure is similar to the error diffusion process where error is passed onto the next pixel and the pixels below, and the error diffusion schemes discussed above may be used to influence neighboring pixels.

The PSA function does not change the calculation of the error in each of the color planes. The PSA function simply changes the effective threshold used to make the determination at each pixel. Therefore, the overall image still maintains the same average and still behaves like error diffusion, except that the planes are not generated independently. Because the dots of ink or toner of different color planes are less likely to land in the same location and stack up on top of each other, the resulting image is more pleasing to the human eye. Particularly, the dispersed dots are noticeably less grainy.

While the PSA function may be applied to the entire image, for 1 bit per pixel output data, the most influence is needed in the highlights and shadows. In another implementation, the PSA function may be implemented in only portions (or sub-parts) of the image, for example in the highlights and shadows. In this example, the halftone module 203 may be configured to detect sequences of pixel values of one or more colors in a series or pattern of pixels to determine that the PSA function should be activated.

The PSA function is naturally a sequential process because the outcome of the halftone decision for one color is made before the halftone decision for the next color may be decided. The PSA function is described below in more detail using alternate implementations of serial processing and parallel processing.

Figure 27:
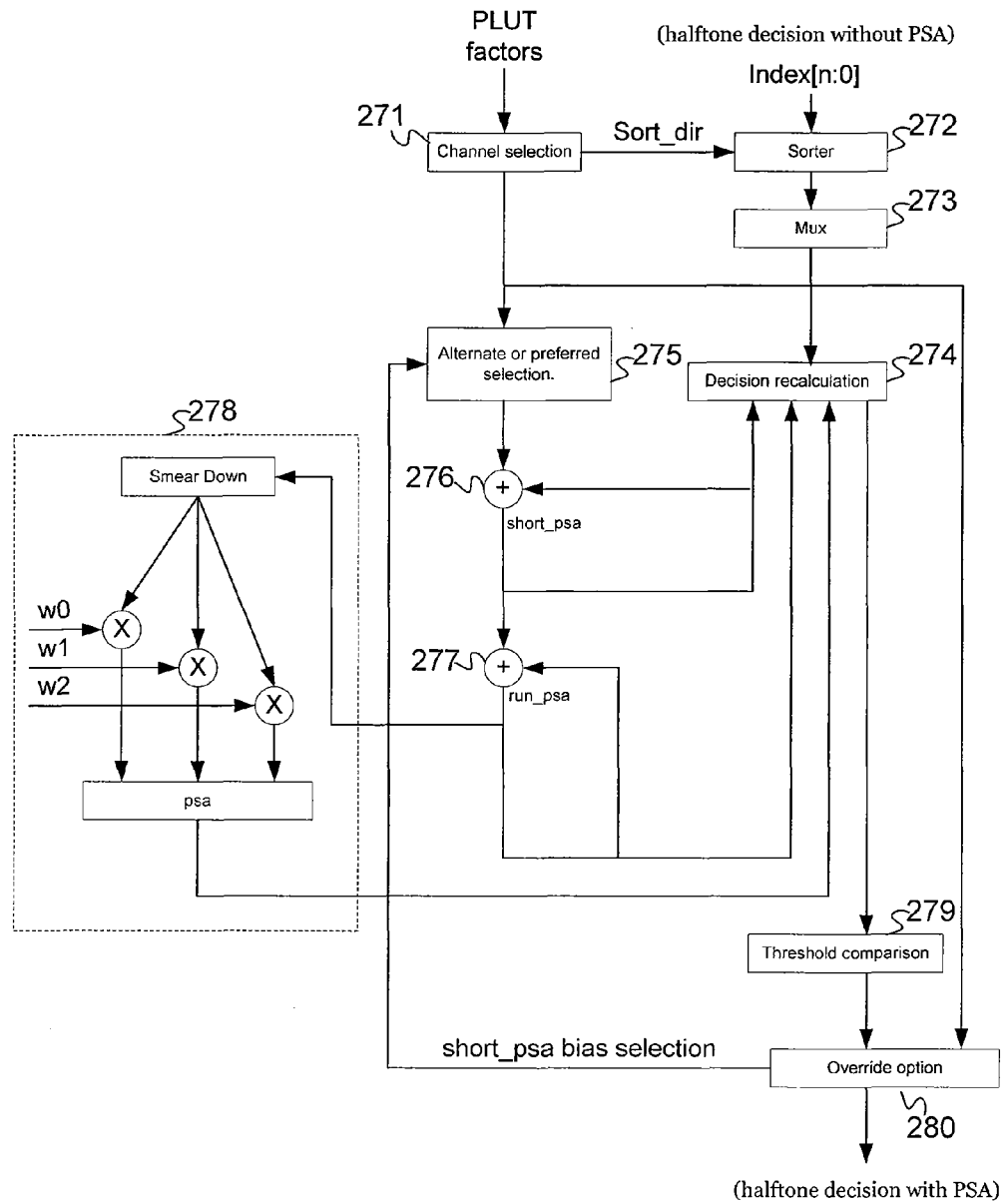
FIG. 27 illustrates a serial flow diagram for pixel stacking avoidance halftoning.

FIG. 27 illustrates a serial flow diagram utilized in pixel stacking avoidance halftoning performed by halftone module 203. First, the channel processing order (color sequence) is determined. The channel processing order may be determined independently for a sub-part of the image, such as for each pixel. The numbers of colors used in the PSA function may be selected based on the type of input image or desired output. Halftone module 203 makes a halftone decision (without the PSA function) for each channel.

The halftone decisions are calculated from the input pixel, previously accumulated error terms, and threshold perturbation (bias). This is the threshold value, but no comparisons are made at this time. The halftone decisions without PSA are sorted by a sorter at 272 to set the channel processing order, which is sequenced at 273 by a multiplexer. The colors may be arranged in a high-to-low or a low-to-high fashion.

Once the channel processing order is established, the first channel is selected at 271 and the corresponding inputs are read from memory 105. The inputs are factors stored by memory 105 in the PSA Lookup Table (PLUT). The PLUT factors include five fields including "preferred," "alternate," "preferredbias," "alternatebias," and "sort_dir." The sort_dir field stores the channel processing order.

The preferred field stores the more likely output value, and the alternate field stores the less likely output value. For example, in a system using 8 bits per pixel per color inputs and 1 bit per pixel output, there are only two possible outcomes: 1 and 0. For all input tones less than 128, the alternate field will correspond to 1 and the preferred field will correspond to 0. For all input tones greater than or equal to 128, the alternate field will correspond to 0 and the preferred field will correspond to 1.

For systems using more than 1 bit per pixel outputs, these fields are used to constrain the output of halftone process. For example, in a 2 bits per pixel output, there are four possible output values: 0, 1 (33% of the possible output), 2 (67% of the possible output), and 3 (100% of the possible output). If the incoming tone is 102, 40% coverage (102/255) is expected. The output should generate several levels 1's (33%) and a few level 2's (66%) to average to about 40%. In this case, the preferred field would be 1 and the alternate field would be 2.

The halftone module 203 may constrain the halftone process to be either the alternate field value or the preferred field value. In other words, regardless of the error diffusion terms, threshold perturbation, or PSA terms, only the two more likely outputs are possible for any given input tone. The halftone module 203 selects the appropriate one of the alternate field and preferred field at 275.

The output decision for a particular pixel color can influence decisions that follow. This influence can be controlled by the preferredbias value and the alternatebias value. The preferredbias value is used when the output decision is to use the preferred value and the alternatebias value is used when the output decision is to use the alternate value. The bias value is distributed forward and to several locations in a subsequent line. Similar to the error diffusion algorithm, it is desirable to have the average of the bias values approach 0, so the two bias values and their expected frequency of use are used to generate one of the two values. Positive bias values will decrease the likelihood of larger pixels and increase the likelihood of smaller pixel values for subsequent calculations. Negative bias values will increase the likelihood of larger pixel values and decrease the likelihood of smaller pixel values for subsequent calculations. The use of these bias values is similar to the use of the bias values for error perturbation in that the bias values will not force any particular decision and should not affect the overall tone of the image but will be used to locally influence the halftone output decision for a particular pixel color.

The preferredbias value and alternatebias value are also similar to the error output of a normal error diffusion algorithm in how they propagate. However, the preferredbias value and alternatebias value are only based on the incoming tone and the output decision and are common to all colors. Making the preferredbias value and alternatebias value apply to all colors allows one color to influence the output decision of another color. For example, if there is a 2 bit per pixel output that represents 0, 33%, 67% and 100% for output values 0, 1, 2, and 3 respectively, and an incoming tone request for 40% coverage, the output should generate a mostly output level 1's (~79% of the time) and a few output level 2's (~21% of the time) so that the average would be 40% over a large area.

The alternatebias value is used when a larger value is placed, and a positive value would be used to discourage larger values in subsequent decisions. If the value of 64 is used for the alternatebias value, a weighted average can be used to select the appropriate preferredbias value: preferredbias=(−alternatebias)*0.21/0.79=−64*0.21/0.79=−17.01. This equality is not a requirement and modifications may be made where the terms do not balance so that the average approaches zero.

At 274, the halftone decision is recalculated using PSA terms for the first color. The PSA terms include "short_psa" and "run_psa." The term run_psa feeds from pixel to pixel, which is similar to the error term in error diffusion that is from the previous pixel. The term short_psa is a bias term for keeping track of all of the influences from one color plane to subsequent color planes. For the first color for each pixel, short_psa will not influence the halftone decision recalculation at 274. Halftone module 203 proceeds to the comparison of the incoming tone to the threshold value to decide whether or not a dot of the current color should be placed at the current pixel at 279. If applicable, at 276, the short_psa impacts the halftone recalculation at 274.

For the first pixel of the input image, run_psa does not influence the halftone decision. If applicable, at 277, the run_psa impacts the halftone recalculation at 274. Block 278 represents the smear down portion of the PSA function. Values that are spread from the current pixel to subsequent or adjacent pixels are based on weights w0, w1, and w2. Any allocation scheme, such as those discussed above with respect to error diffusion, may be implemented by the halftone module 203.

In addition, the PSA function includes an override option at 280 where the PSA function may be bypassed if it is not needed. For example, certain colors (e.g., yellow), image features (e.g., text) may not substantially benefit from the PSA function. The override option may examine portions of the image for various aspects, such as certain colors or image features, and determine to bypass the PSA function if these various aspects are present.

The PSA function may be implemented in hardware, software, or firmware, as described in the example below. The PSA function may be stored in memory 105 and executed in controller 103 either by processor 201 or halftone module 203. The PSA module decreases the likelihood that pixels are grouped in ways that would be more noticeable on the printed page.

The following is another serial implementation of the PSA function. As discussed above, the PSA function calculates a value for each of the colors based on this same summation of terms (incoming pixel value+errors+bias). Based on these values, the PSA function places the color planes in an order. The color having the highest value is placed first in the order because it corresponds to the color that is most likely to place a dot. The bias term "run_psa" feeds from pixel to pixel, which is similar to the error term in error diffusion that is from the previous pixel. The bias term "short_psa" tracks all of the error diffusion color decisions for one pixel.

A two dimensional table used to provide the bias values and only apply those for certain decisions is referred to as "psa_lut," which is a tone dependent table since the values used are based on the incoming pixel value rather than error terms. A "psa" is an entire row of bias terms, similar to the row of error terms used for each color. Only one psa row is used since it is used per pixel, not per color.

The actual error diffusion decision will partially be made on the summation of the same terms as before, including "in" as the incoming pixel value, "err1" as the error diffusion term from the previous line, and "err2" as the error diffusion term from the previous pixel. The actual error diffusion decision is also influenced by the new terms introduced above. For example, one formula is: index=in+err1+err2−signed bias−psa (previous row)−run_psa−short_psa.

The additional psa terms affect the error diffusion decision. At the start of each pixel, short_psa is cleared. It can be updated after each color's error diffusion decision within a single pixel. After the first error diffusion decision (for the most likely placement of a pixel), the data from the psa_lut is used to modify short_psa. This data is looked up based on the incoming value, which can be done prior to or in parallel with the error diffusion decision. The psa_lut data that represents the bias value is added to short_psa if the output decision of the error diffusion is the same as the psa_lut's second output value. For example, if error diffusion determines that the output is a 2 and the psa_lut returns a −32 and a 1, the −32 would not be added to short_psa. If the error diffusion decision is a 1, then the −32 would be added to short_psa, as represented by the following pseudo-code:

if (psa_lut(2,tone)==EDoutput)

short_psa=short_psa+psa_lut(1,tone).

The subsequent pixels are sequentially processed and the short_psa value is used to convey previous error diffusion decisions for all of the previous colors on to the next color. After all of the colors have been processed, the short_psa value is spread to the next line (into psa) and onto the next pixel (into run_psa).

A term is generated to propagate the error down as represented by the following pseudo-code:

Smear_down=(run_psa+short_psa)+psa(row,col)*1.5:

// The 1.5 is a config register value

// This smear down value is scaled by values and accumulated in 3 downward directions: 3/16 behind, 5/16 below and 1/16 ahead. These values are register configurable. For the forward scan direction:

psa(row+1,col−1)=psa(row−1,col−1)+smear_down*3/16;

psa(row+1,col)=psa(row−1,col)+smear_down*5/16;

psa(row+1,col+1)=smear_down*1/16:

// psa is a 1 dimensional array, so care is needed not to

// overwrite the previous lines data. Similar to the err ram.

// run_psa is now updated to move some bias onto the next pixel:

run_psa=(run_psa+short psa)*0.4;

// The 0.4 is a config register setting.

For color planes that are not involved, a way of removing them from the process is used. For ease of implementation, simply setting the psa_lut values to 0 removes their effect. If there is a significant speed penalty to the sequential nature of the error diffusion process, color planes that are not involved could be removed from the sequential process and allowed to be processed in parallel, which would not affect the short_psa value that corresponds to the current pixel. Normal error diffusion would be performed on the colors that are not being used for that pixel. This process may take 6-7 clocks per pixel for 6 colors, and may be implemented to take only 3 clocks when using three channels, such as C, M, and K.

Figure 28:
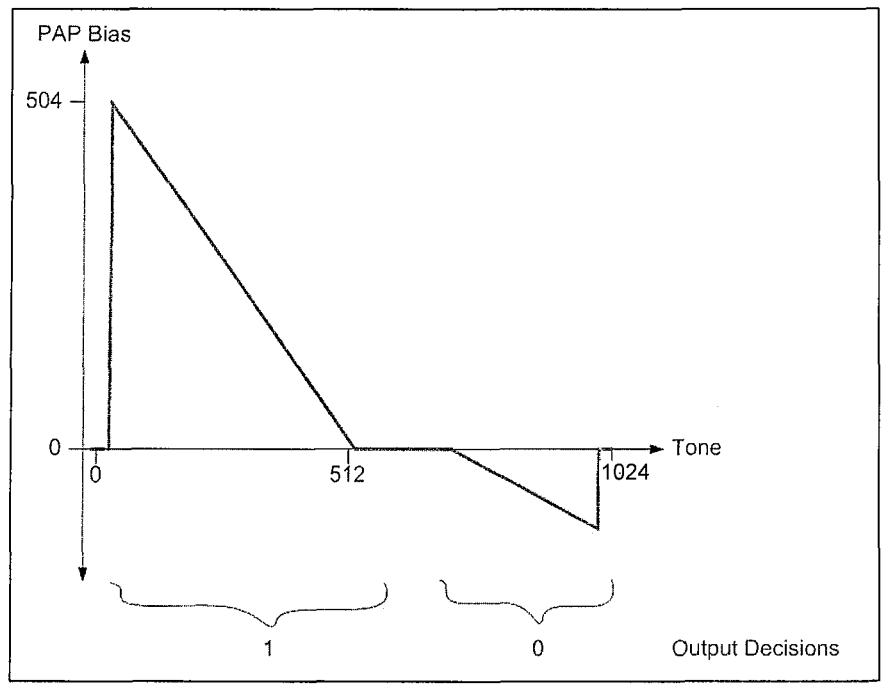
FIG. 28 is a graph of a bias between color planes using a 2-bit output.
Figure 29:
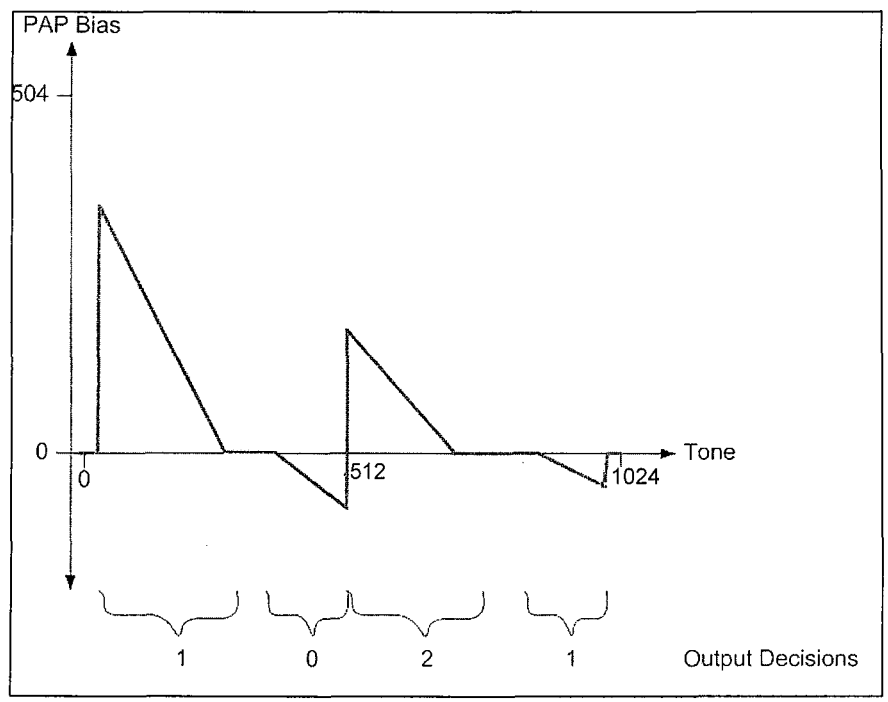
FIG. 29 is a graph of a bias between color planes using a 3-bit output.

FIGS. 28 and 29 illustrate graphs of the values loaded into psa_lut for two different cases. The graph of FIG. 28 is based on data from a 10 bit per pixel input and a 1 bit per pixel output that represents 1 drop of ink per pixel. The positive values for the PSA bias are applied only with smaller input values (the lighter half of possible incoming tone values) and only when a value of 1 is output (a drop is needed). This effectively pushes away drops of color in other color planes.

The negative values are only applied if the input values are very high (darkest ¼ of possible incoming tone values) and only when a value of 0 is output (a blank space is needed). This pushes away blank spaces in other color planes.

FIG. 29 shows a 10 bit per pixel input and a 2 bit per pixel output that represents 0, 1, or 2 drops per pixel, which is similar to the 1 bit per pixel example but has two separate shorter shapes. This allows a somewhat independent bias to be applied for either the first or the second drop. This extends to higher levels of output values, up to the 16 level outputs (4 bits per pixel) or higher.

Figure 30:
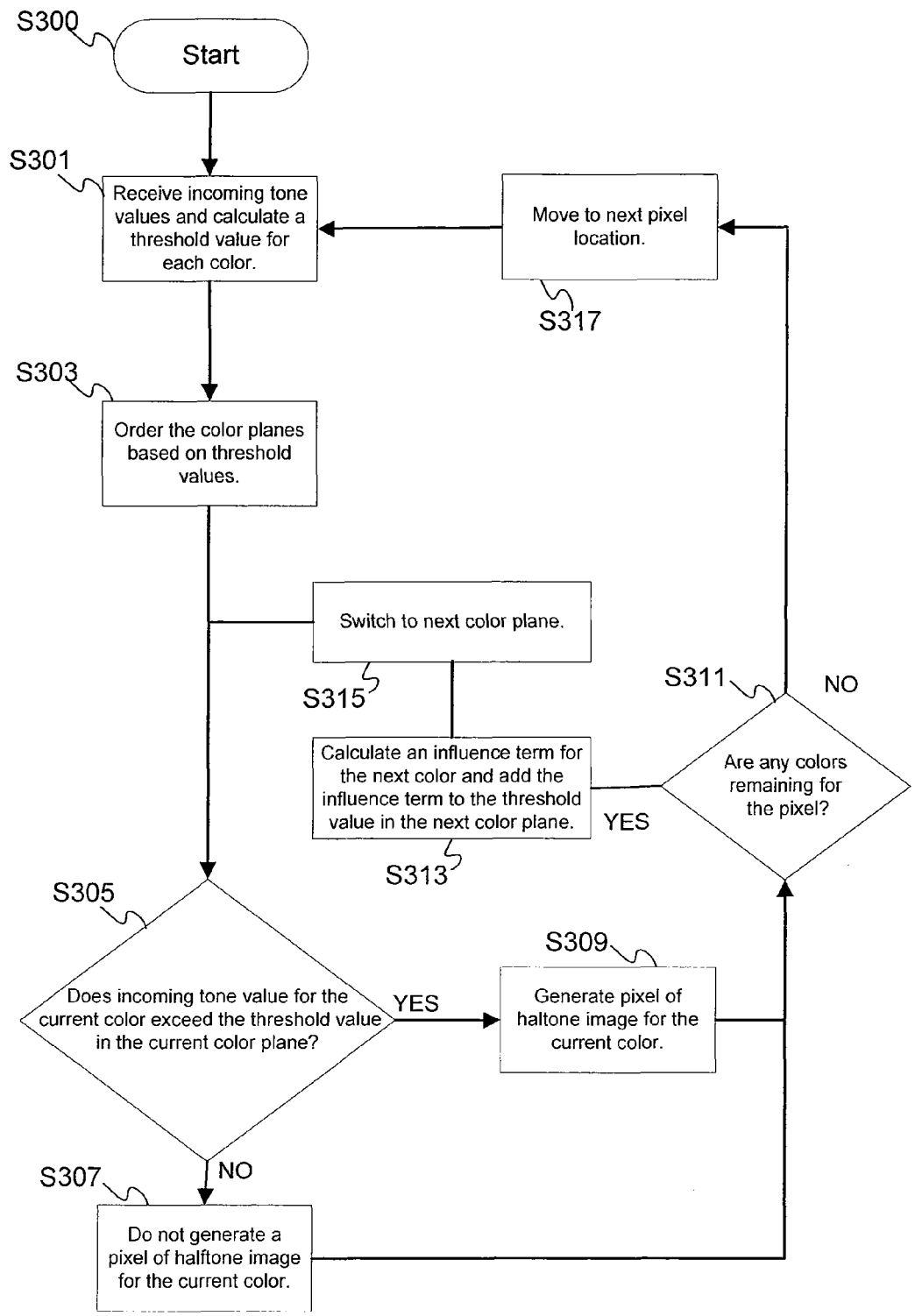
FIG. 30 illustrates a flow chart of an error diffusion algorithm using pixel stacking avoidance.

FIG. 30 illustrates a flow chart of an error diffusion algorithm using pixel stacking avoidance. The error diffusion algorithm begins at S300. At S301, the processor 201 receives incoming tone values for each color and the halftone module 203 calculates a threshold value for each color. At S303, the halftone module 203 orders the color planes based on the threshold values so that the halftoning algorithm is performed on the color that is most likely to be placed at that pixels. At S305, the halftone module 203 determines whether the incoming tone value for the current color exceeds the threshold value (as adjusted by the error terms above). The threshold value may additionally be adjusted by threshold perturbation, as described above. If the incoming tone value exceeds the adjusted threshold value, a dot of ink or toner for the current color is generated for that pixel in the halftone image at S309. If it does not, no dot of ink or toner is generated for the current color is generated for that pixel in the halftone image at S307.

Then, at S311, the halftone module 203 determines whether any colors remain for the pixel. If no colors remain, the algorithm moves to the next pixel location at S317. If colors do remain, at S313 the halftone module 203 will calculate an influence term for the next color and add the influence term to the threshold value in the next color plane. The halftone module 203 then switches to the next color plane at S315 and the process repeats until no colors and no pixels remain.

The pixel stacking avoidance function is sequential. However, significant improvements in processing time may be achieved if the halftone calculations are performed in parallel rather than sequentially. There are a manageable number of possibilities for the halftone decisions in each pixel. For example, if the output is 1 bit per pixel in a four color system, there are 16 possibilities for the pixel, and in a three color system, there are eight possibilities for the pixel. The PSA terms may be calculated for all 16 possibilities at once, which reduce the number of clock cycles used by the pixel stacking avoidance function.

Figure 31:
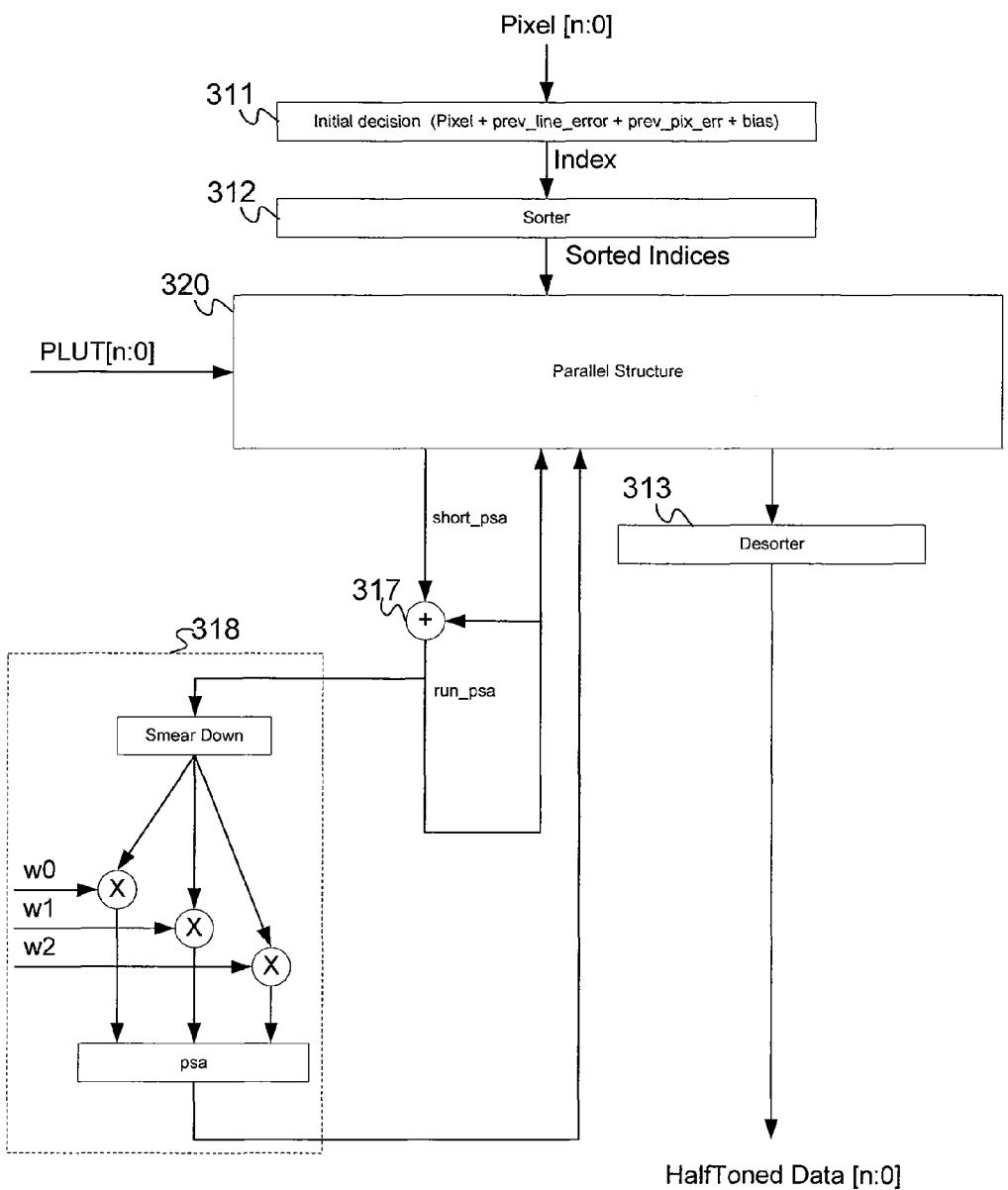
FIG. 31 illustrates a parallel flow diagram for pixel stacking avoidance halftoning.

FIG. 31 illustrates a parallel flow diagram for pixel stacking avoidance halftoning. At 311, halftone module 203 calculates the initial halftone decision (halftone values) for each color plane. At 312, the initial halftone values are then sorted. Block 320 represents the parallel structure illustrated in more detail in FIG. 32. Block 318 represents the smear down portion of the PSA function. Values that are spread from the current pixel to subsequent or adjacent pixels based on weights w0, w1, and w2. At 317, run_psa impacts the halftone recalculation performed in block 320. At 313, a desorter puts the colors back in the order appropriate for the printer to read the halftone outputs.

Figure 32:
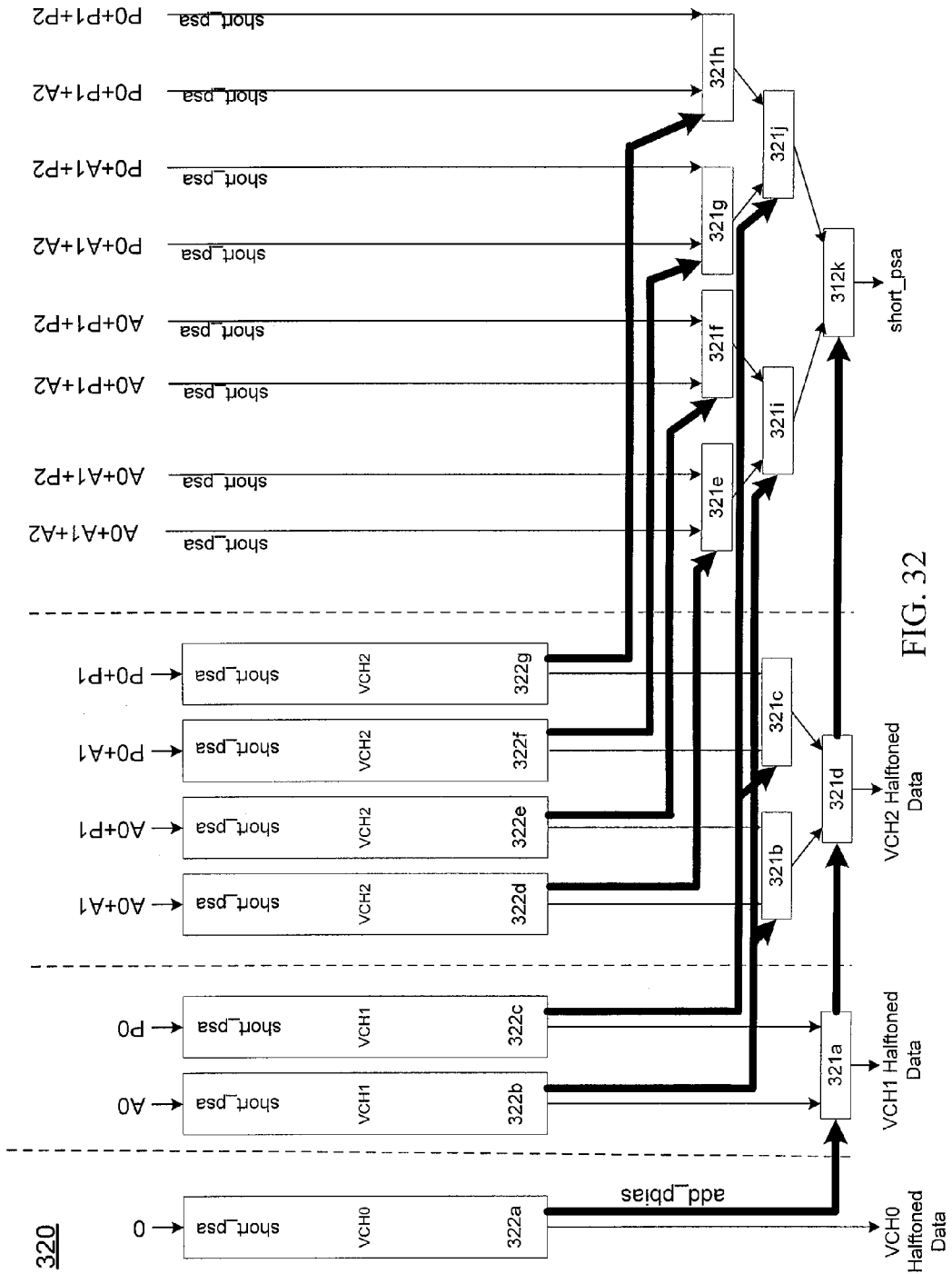
FIG. 32 illustrates the parallel structure of FIG. 31 in a three color system.

FIG. 32 illustrates the parallel structure of FIG. 31 in a three color system. For the data path 322a of first channel VCH0, only one calculation is needed. The result may be fed directly to the output. For the data paths 322b-c of the second channel VCH1, two possibilities are calculated based on the two possible results from first channel VCH0. That is, the first channel VCH0 may have resulted in either the alternate value A0 or the preferred value P0. Once the result from first channel VCH0 is known, the add_pbias signal to select the output of multiplexer 321a for the second channel VCH1.

Likewise, for the data paths 322d-g of the third channel VCH2, four possibilities are calculated based on the two possible results of first channel VCH0 each paired with the two possible results of second channel VCH1. The results from the second channel VCH1 are fed using add_pbias signals to multiplexers 321b and 321c to narrow the results from the third channel. The results from the first channel VCH0 are fed to multiplexer 321d to narrow the results to a final output for the third channel VCH2.

In a similar fashion, the results of third channel VCH2, the second channel VCH1, and the first channel VCH0 control multiplexers 321e-k to select the appropriate value of short_psa to be forwarded for use in calculating the next pixel. Eight possible values are calculated and loaded into multiplexers 321e-h. Half of those values are discarded based on the add_pbias values from the third channel VCH2. The remaining values are loaded into multiplexers 321i and 321j. Half of those values are discarded based on the add_pbias values from the third channel VCH1. The remaining values are loaded into multiplexer 321k. The final short_psa value is selected from multiplexer 321k based on the add_pbias value from the first channel VCH0. In other words, all eight possible final short_psa values are calculated in parallel, and the appropriate value from the eight possibilities is selected based on the actual results of the first channel VCH0, the second channel VCH1, and the third channel VCH2.

The numbering of the channels may change for each pixel. The numbering does not necessarily relate to the physical location of the channel of the particular color assigned to the channel. For example, in a four color system, the incoming data for each of four colors of the current pixel includes the preferred value, alternate value, and index value for each color: (1) PLUT preferred_c, PLUT_alternate_c, Index_c, (2) PLUT_preferred_m, PLUT_alternate_m, Index_m, (3) PLUT_preferred_y, PLUT_alternate_y, Index_y, and (4) PLUT_preferred_k, PLUT_alternate_k, Index_k.

The data is sorted as a group for each color based on the index value for each color. The data is assigned to a channel shown in FIG. 32 based on the sort order. For example, if the Indexes were such that Index_y>Index_m>Index_c>Index_k and the sort direction is high-to low, then the following assignments would be made: (1) VHC0—'y' channel data (PLUT_preferred_y, PLUT_alternate_y, Index_y), (2) VHC1—'m' channel data (PLUT_preferred_m, PLUT_alternate_m, Index_m), (3) VHC2—'c' channel data (PLUT_preferred_c, PLUT_alternate_c, Index_c), and (4) VHC3—'k' channel data (PLUT_preferred_k, PLUT_alternate_k, Index_k).

The short_psa terms (shown in FIG. 32 as the data going into the top of each channel) also are assigned by the same sort criteria: A0=Alternate Bias from the 'y' channel, P0=Preferred Bias from the 'y' channel, A1=Alternate Bias from the 'm' channel, P1=Preferred Bias from the 'm' channel, A2=Alternate Bias from the 'c' channel, P2=Preferred Bias from the 'c' channel, A3=Alternate Bias from the 'k' channel, and P3=Preferred Bias from the 'k' channel.

Figure 33:
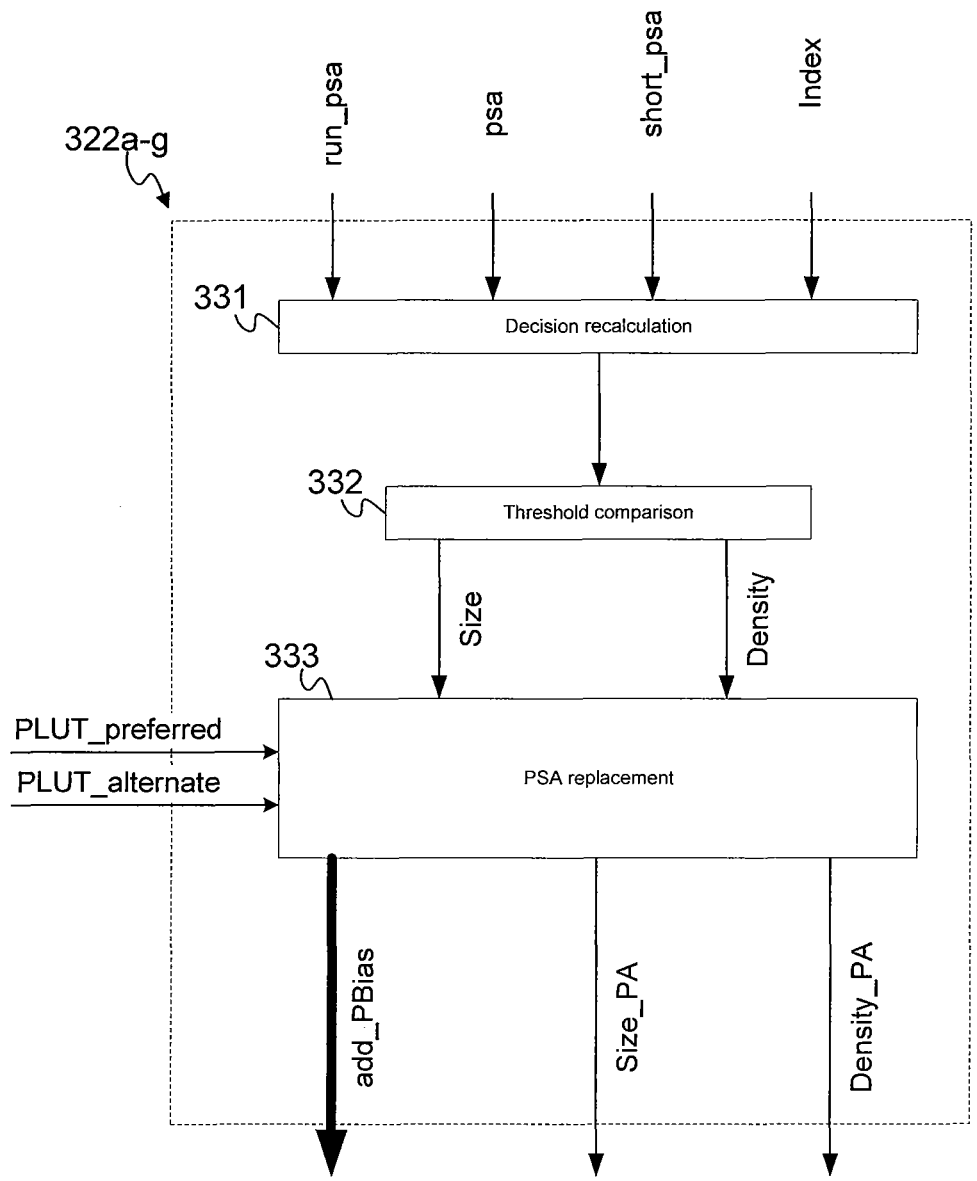
FIG. 33 illustrates the common data path used in the parallel structure of FIG. 32.

FIG. 33 illustrates the common data path used in the parallel structure of FIG. 32. Each of data paths 322*a-g* includes the functionality shown in FIG. 33. At 331, the halftone decision is recalculated based on the PSA values discussed above with respect to the serial implementation. At 332, the halftone module 203 compares the incoming tone to the threshold value. Size is a signal indicative of the output of the halftone. When using systems with outputs higher than 1 bit per pixel, the output generally corresponds to the size of the dot. Density is a signal that is a function of size and in a value that can be fed back for error diffusion calculations. At 333, one of the preferred and alternate values are selected from the PLUT and used to generate the add_PBias signal, which will be used in the next color plane as shown by FIG. 32.

The number of data paths required increases exponentially with the number of channels. Therefore, this methodology is more practical for systems with a modest number of channels. For larger numbers of channels, a serial implementation is not necessary. Instead, the parallel structure can be utilized to process the first half (or any fraction) of the channels and the resulting halftoned data stored. The same structure is used for the second half of the channels and the results are concatenated with the first half to produce the final result. This requires two states per pixel, but still requires fewer clock cycles that the serial method.

The short_psa adders at the head of the datapaths can also be reduced. For instance, for a six channel system utilizing this split approach, the structure of FIG. 32 is utilized twice. The short_psa adders for the last channel would be of the form A0+A1+A2+A3+A4+A5. But these large adders are not necessary. A short_psa value can be output from the data structure from the first cycle that is the correct value for the first half of the channels. This is fed forward to the second cycle adders. So, the adders in the example above would be in the form of A0+A1+A2+short_psa_previous. After the second cycle, the output short_psa is then the final, complete short_psa, and it is summed into the run_psa and psa values. Only a single run_psa and psa is needed external to the parallel structure.

Since error diffusion using pixel stacking avoidance involves the spreading out of dots, it tends to reduce the spatial bandwidth of the image. Stacking dots on each other near an edge requires detecting the existence of an edge. The halftone module 203 may determine the horizontal edge strength by using a small 5 pixel horizontal filter and calculating edge strength (or gradient, etc.).

The result may be used either to stop the PSA process or to scale the psa_lut bias value. For example, in regions of no change, the psa_lut bias value uses the full value. In regions with a large step function, the psa_lut bias value is forced to 0. In between these two extremes, the psa_lut bias value is scaled to some portion of the full value. The edge strength can be determined in more directions, so a full 5×5 window of the incoming data would be able to supply the gradient information.

As in all disclosed embodiments, this system may be implemented using any possible mappings for the tone values. For example, White=255, black=0 or black=255 and white=0 are possible for 8 bit values, and White=1023, black=0 or black=1023 and white=0 are possible for 10 bit values.

The above examples are based on 8-bit (0-255) or 10-bit (0-1023) values. Other numbers of bits are possible. Though, not all color planes need to be involved. For example, yellow may be skipped since it has less impact on the perceived graininess of the image compared to black. Different color planes may also have unique effects on other colors planes. The discussion above treats all selected color planes as identical; alternatively, the selected color planes may be treated differently. The pixel stacking avoidance halftoning function may be implemented in hardware, software, or firmware.

Although specific embodiments have been described and illustrated, the invention is not to be limited to the specific forms or arrangements of parts so described and illustrated. The scope of the invention is to be defined by the claims appended hereto and their equivalents. It is intended that the foregoing detailed description be understood as an illustration of selected forms that the invention can take and not as a definition of the invention. It is only the following claims, including all equivalents, which are intended to define the scope of this invention.

What is claimed is:

1. A method of generating a halftone image from an input image comprising a plurality of colors, the method comprising:
   comparing, by a controller, threshold values corresponding to color planes associated with the plurality of colors comprising the input image;
   based on the comparison, dynamically setting a halftoning sequence by determining an order of color planes to perform a halftone image analysis from amongst the color planes associated with the plurality of colors comprising the input image;
   performing, by the controller, halftone image analysis on the portion of the input image in a first color plane according to the halftoning sequence, wherein the halftone image analysis in the first color plane references a first threshold value to determine whether to generate a dot in a first color corresponding to the first color plane in the portion of the input;
   performing, by the controller, halftone image analysis on the portion of the input image in a second color plane according to the halftoning sequence, wherein the halftone image analysis on the portion of the input image in the second color plane references a second threshold value that is adjusted to increase or decrease a likelihood that a dot of a second color corresponding to the second color plane is generated in the portion of the input image during the halftone image analysis, the second threshold value being based on whether the controller determines to generate a dot of the first color corresponding to the first color plane in the portion of the input image; and
   outputting the halftone image based on the halftone image analysis.

2. The method of claim 1, wherein the analysis of the portion of the input image comprises analysis of a single pixel of the input image.

3. The method of claim 1, wherein comparing the threshold values comprises comparing the first threshold value with the second threshold value.

4. The method of claim 1, further comprising:
adjusting the second threshold value based on a halftone decision involving the first threshold value.

5. The method of claim 1, wherein the second threshold value is adjusted to increase a likelihood that a dot of the second color is generated when a dot of the first color was not generated.

6. The method of claim 1, wherein the second threshold value is adjusted to decrease a likelihood that a dot of the second color is generated when a dot of the first color was generated.

7. The method of claim 1, wherein the halftone image analysis includes an error diffusion term from a preceding pixel.

8. The method of claim 1, wherein the input image comprises 8-bit values and the halftone image comprises a 1-bit value.

9. A printer controller for generating a halftone image from an input image, the input image comprising a plurality of colors, the printer controller comprising:
an interface configured to receive a portion of the input image; and
a processor configured to:
compare threshold values corresponding to color planes associated with the plurality of colors comprising the input image;
based on the comparison, dynamically set a halftoning sequence by determining an order of color planes for performing a halftone image analysis from amongst the color planes associated with the plurality of colors comprising the input image, and
perform halftone image analysis on the portion of the input image in a first color plane according to the halftoning sequence, wherein the halftone image analysis in the first color plane references a first threshold value to determine whether to generate a dot in a first color corresponding to the first color plane in the portion of the input image;
perform halftone image analysis on the portion of the input image in a second color plane according to the halftoning sequence, wherein the halftone image analysis on the portion of the input image in the second color plane references a second threshold value that is adjusted to increase or decrease a likelihood that a dot of a second color corresponding to the second color plane is generated in the portion of the input image based on whether the processor determines to generate a dot in the first color corresponding to the first color plane in the portion of the input image, and
output the halftone image based on the halftone image analysis.

10. The printer controller of claim 9, wherein the analysis of the portion of the input image comprises analysis of a single pixel of the input image.

11. The printer controller of claim 9, wherein the processor is configured to compare the threshold values by comparing the first threshold value with the second threshold value.

12. The printer controller of claim 9, wherein the processor adjusts the second threshold value based on a halftone decision involving the first threshold value.

13. The printer controller of claim 9, wherein the second threshold value is adjusted to increase a likelihood that a dot of the second color is generated when a dot of the first color was not generated.

14. The printer controller of claim 9, wherein the second threshold value is adjusted to decrease a likelihood that a dot of the second color is generated when a dot of the first color was generated.

15. The printer controller of claim 9, wherein the halftone image analysis includes an error diffusion term from a preceding pixel.

16. The printer controller of claim 9, wherein the input image comprises 8-bit values and the pixel of the halftone image comprises a I-bit value.

17. A method of generating a halftone image from an input image, the method comprising:
setting, by a controller, a color processing order based on a comparison of a first threshold value with a second threshold value, wherein the first threshold value corresponds to a first color of a pixel of the input image and the second threshold value corresponds to a second color of the pixel of the input image;
receiving, at the controller, a first tone value corresponding to the first color of the pixel from the input image;
comparing, by the controller, the first tone value to the first threshold value;
generating, by the controller, a dot of the first color in a first color plane corresponding to the first color at the pixel if the first tone value exceeds the first threshold value;
adjusting the second threshold value by a discouraging factor that will decrease a likelihood that a dot of the second color is generated at the pixel if the first tone value exceeds the first threshold value, or adjusting the second threshold value by an encouraging factor that will increase a likelihood that a dot of the second color is generated at the pixel if the first tone value does not exceed the first threshold value;
receiving, at the controller, a second tone value corresponding to the second color of the pixel from the input image;
comparing, by the controller, the second tone value to the second threshold value; and
generating, by the controller, a dot of the second color in a second color plane corresponding to the second color at the first pixel if the second tone value exceeds the second threshold.

18. The method of claim 17, wherein the first threshold value and the second threshold value are initially set to the same value.

* * * * *